US006692392B2

(12) United States Patent
Finnegan et al.

(10) Patent No.: US 6,692,392 B2
(45) Date of Patent: Feb. 17, 2004

(54) LAGGING SYSTEM FOR CONVEYOR BELT PULLEYS

(75) Inventors: Robert K. Finnegan, Lakewood, IL (US); Peter M. Ramsey, Glen Ellyn, IL (US); Michael J. Gayford, Naperville, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 09/753,490

(22) Filed: Jan. 2, 2001

(65) Prior Publication Data

US 2002/0046929 A1 Apr. 25, 2002

Related U.S. Application Data

(60) Provisional application No. 60/173,755, filed on Dec. 30, 1999.

(51) Int. Cl.[7] ............................................. F16H 55/48
(52) U.S. Cl. ....................................... 474/190; 474/184
(58) Field of Search ................................ 474/184, 186, 474/188, 189, 190, 191, 270, 271

(56) References Cited

U.S. PATENT DOCUMENTS

| 283,356 A | 8/1883 | Painter |
| 287,568 A | 10/1883 | Osborne |
| 414,307 A | 11/1889 | Gorham et al. |
| 1,593,751 A | 7/1926 | Carter |
| 1,636,492 A | 7/1927 | Taylor |
| 1,748,100 A | 2/1930 | Avery |
| 1,765,402 A | 6/1930 | Carter |
| 1,765,403 A | 6/1930 | Carter |
| 1,803,357 A | 5/1931 | Robins |
| 1,811,916 A | 6/1931 | Carter |
| 1,838,164 A | 12/1931 | Tannewitz |
| 2,369,635 A | 2/1945 | Bacon |
| 2,639,560 A | 5/1953 | Cosmos |

(List continued on next page.)

FOREIGN PATENT DOCUMENTS

JP 55-13505 * 10/1980 ............ B65G/23/04

OTHER PUBLICATIONS

Precision, Inc. —Fas–Lag™ brochure, 1 page, as presently advised, published before 1999.
Conviber, Inc. Flexible Tack–Lag Pads brochure, 2 pages, as presently advised, published before 1999.
Stockton Rubber MFG. Co., Inc., Pad–Lag brochure, 4 pages, as presently advised, published before 1999.
Holz Rubber Company, Inc., Slide–Lag brochure, 11 pages, published 1980.

Primary Examiner—Thomas R. Hannon
Assistant Examiner—Timothy McAnulty
(74) Attorney, Agent, or Firm—Fitch, Even, Tabin & Flannery

(57) ABSTRACT

A lagging system for conveyor belt pulleys is provided that allows for significant flexibility in attaching lagging members to the face of the pulleys while also providing improved distribution of the lagging material on the pulley face, and doing this while avoiding the creation of unduly long and circumferentially wide gaps between adjacent lagging members attached on the pulley. The lagging system can include lagging strips having non-linear leading/trailing edges thereof to allow adjacent strips to be attached without the undesired gaps formed therebetween. Preferably, the strips have projecting portions with fitment spaces defined therebetween with the projecting portions being offset on either side of the strip axis so that portions from one strip can be interfit in fitment spaces of an adjacent strip with lagging material or tiles thereon overlapping the lagging material or tiles on the projecting portions of the adjacent strip in the circumferential direction.

22 Claims, 17 Drawing Sheets

U.S. PATENT DOCUMENTS

| | | |
|---|---|---|
| 2,643,549 A | 6/1953 | Whitesell |
| 2,673,469 A | 3/1954 | Carter |
| 2,673,470 A | 3/1954 | Cosmos |
| 2,701,971 A | 3/1955 | Carter et al. |
| 2,770,868 A | 11/1956 | Streckfus et al. |
| 2,778,234 A | 1/1957 | Carter |
| 2,836,982 A | 6/1958 | Voss et al. |
| 3,211,016 A | 10/1965 | Carter |
| 3,318,165 A | 5/1967 | McAleer et al. |
| 3,354,735 A | 11/1967 | Holz |
| 3,789,682 A | 2/1974 | Holz |
| 3,996,810 A | 12/1976 | Groff |
| 4,034,618 A | 7/1977 | Groff et al. |
| 4,217,944 A | 8/1980 | Pascal |
| 4,284,409 A | 8/1981 | Van Teslaar |
| 4,290,761 A * | 9/1981 | Suginaka .................... 474/190 |
| 4,439,173 A | 3/1984 | Fokos |
| 4,673,380 A | 6/1987 | Wagner |
| 4,718,544 A | 1/1988 | Herren |
| 4,722,721 A | 2/1988 | Wetzel |
| 4,722,722 A | 2/1988 | Rampe |
| 4,821,871 A | 4/1989 | Herren |
| 4,832,669 A | 5/1989 | Holz |
| 4,838,842 A | 6/1989 | Ohkata et al. |
| 4,855,174 A | 8/1989 | Kawamoto |
| 4,973,292 A | 11/1990 | Mevissen |
| 5,190,146 A | 3/1993 | Valster et al. |
| 5,205,796 A | 4/1993 | Valster et al. |
| 6,168,544 B1 * | 1/2001 | Barnes et al. ................ 474/190 |

* cited by examiner

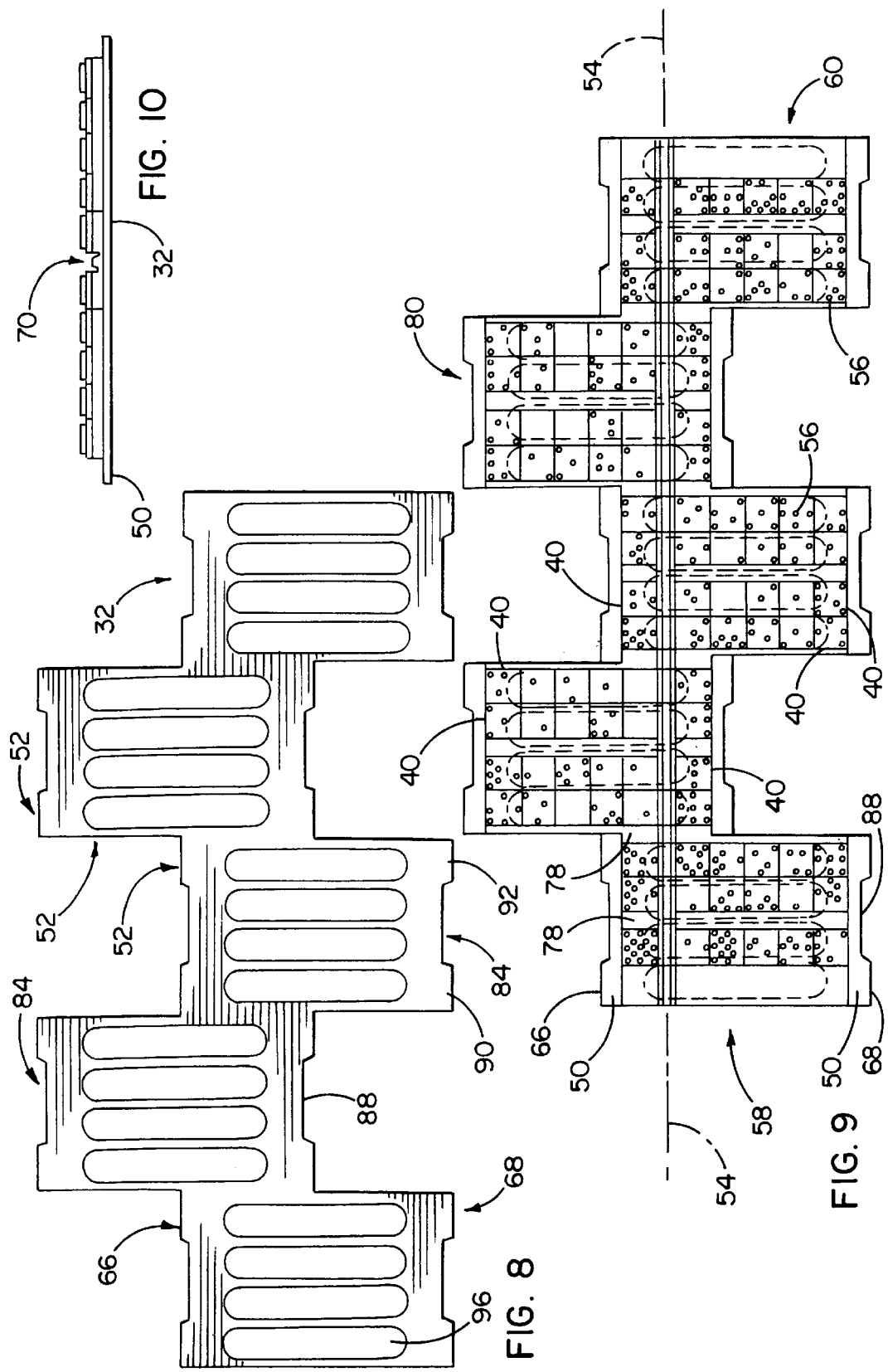

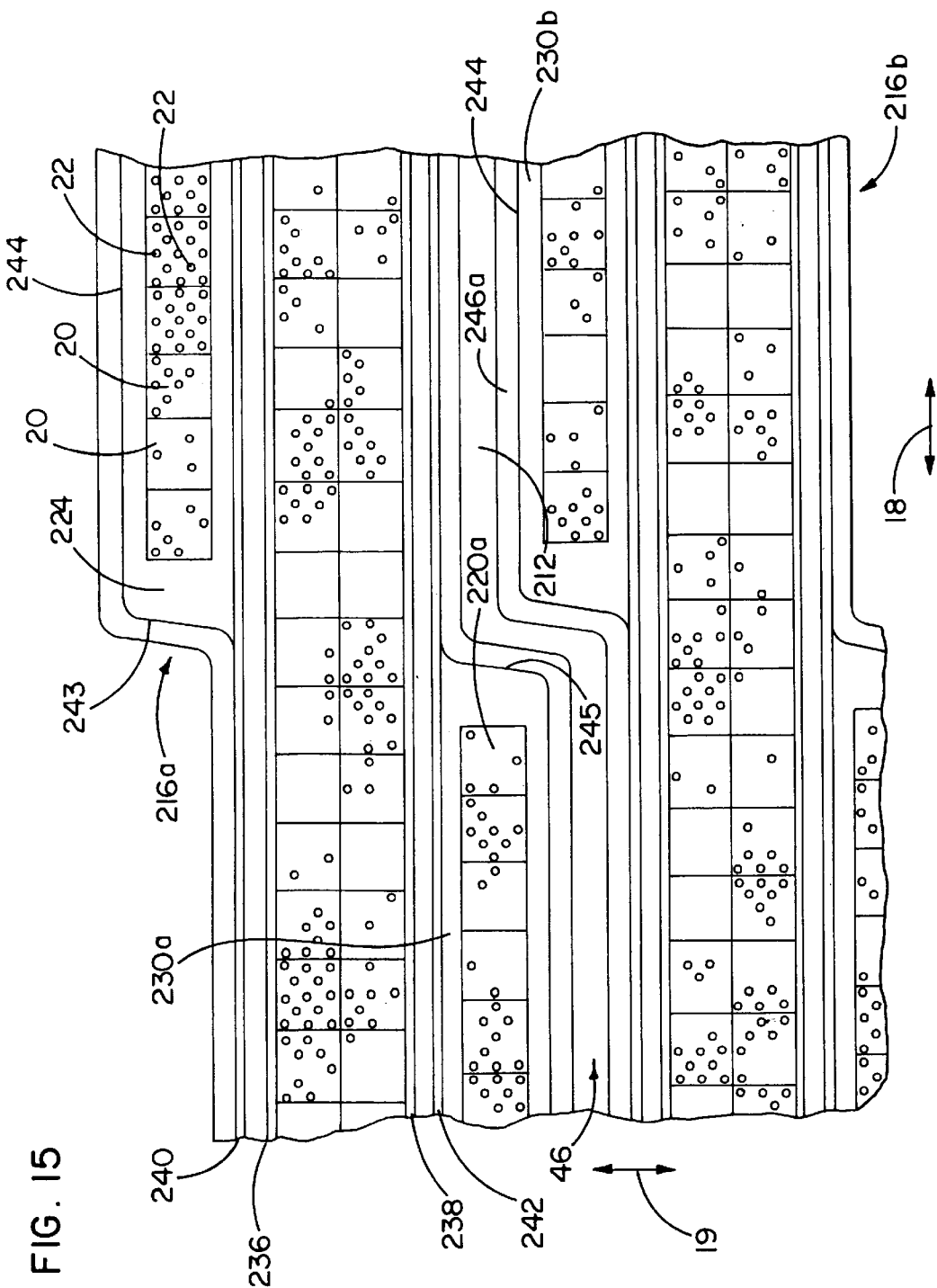

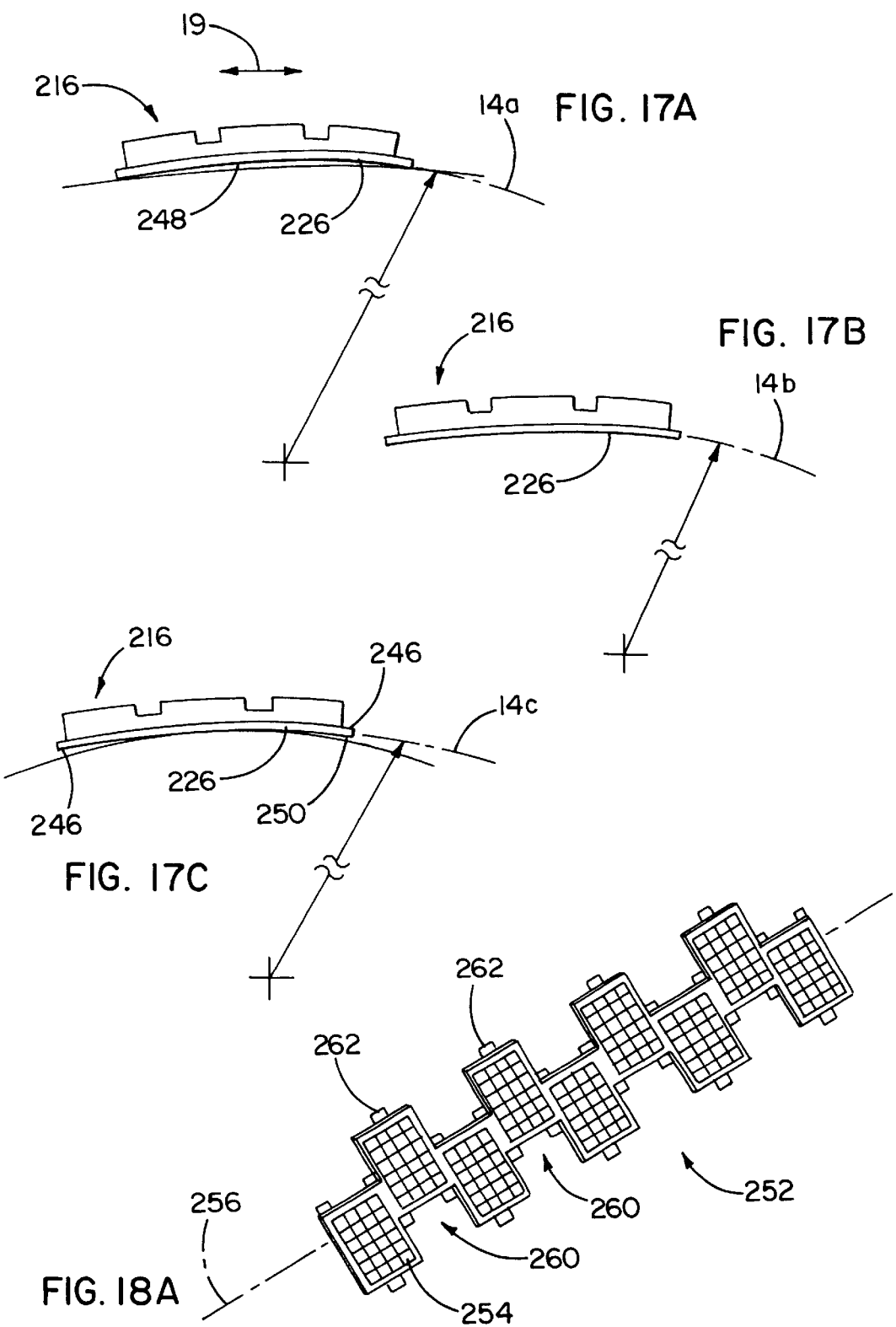

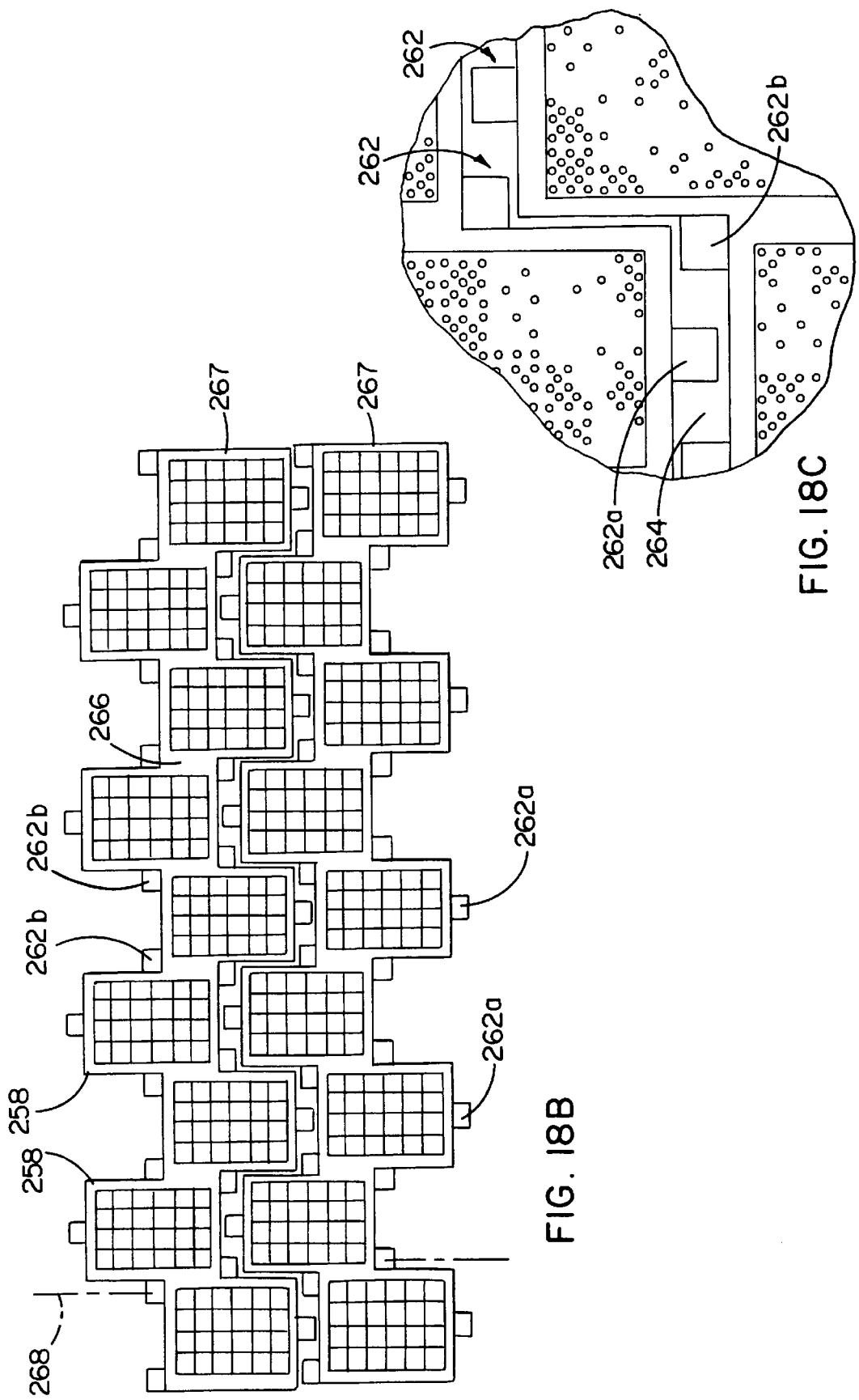

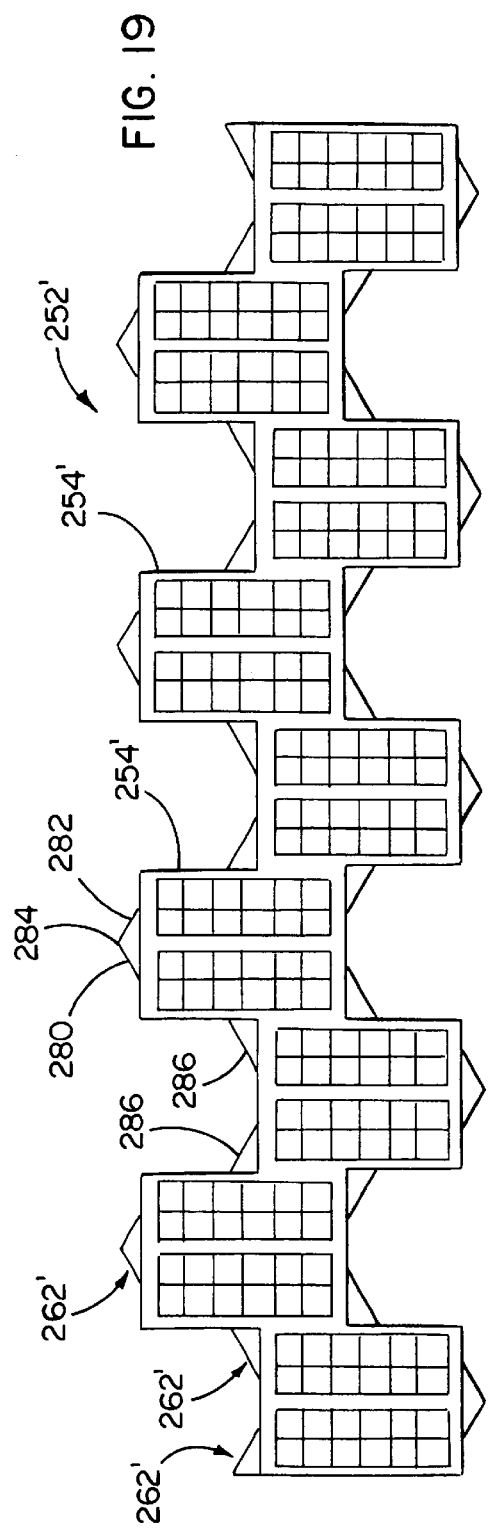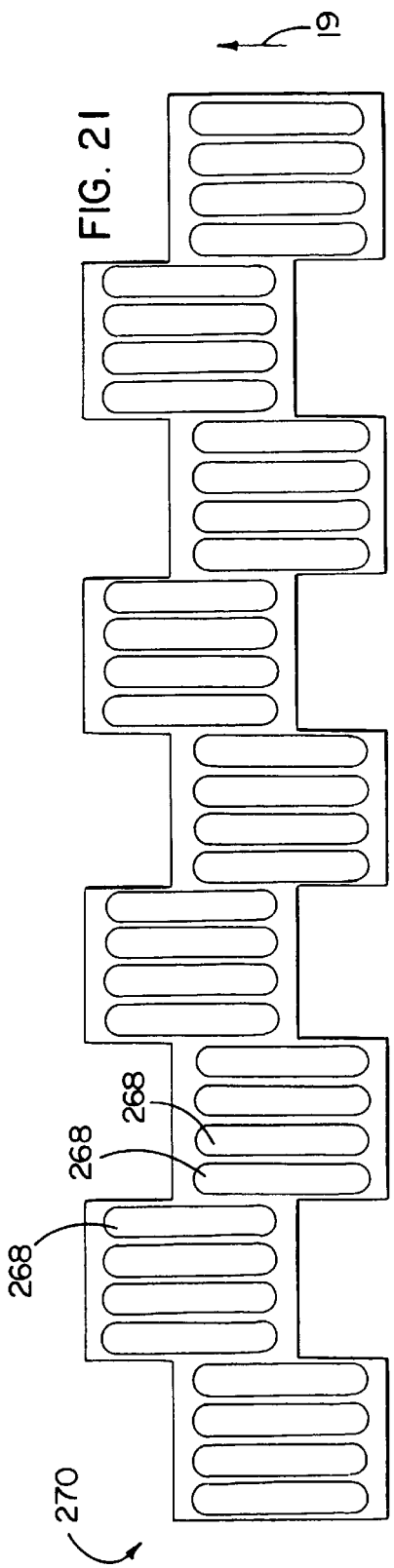

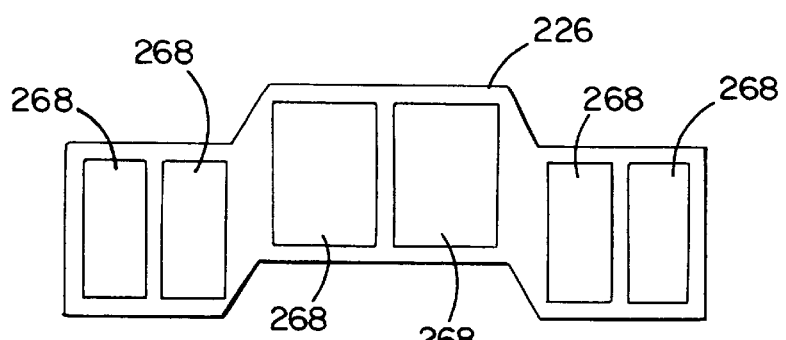
FIG. 20D
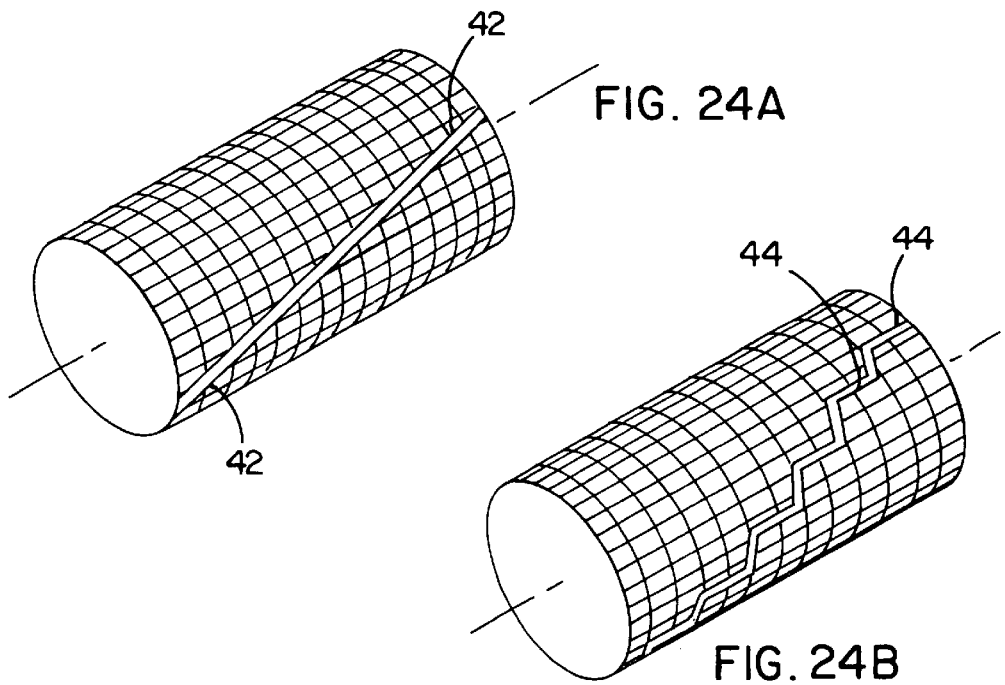
FIG. 24A
FIG. 24B
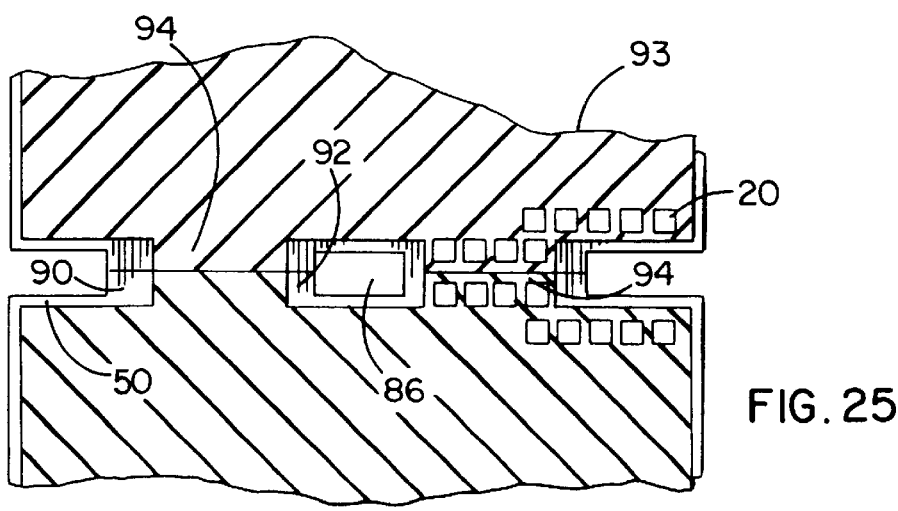
FIG. 25

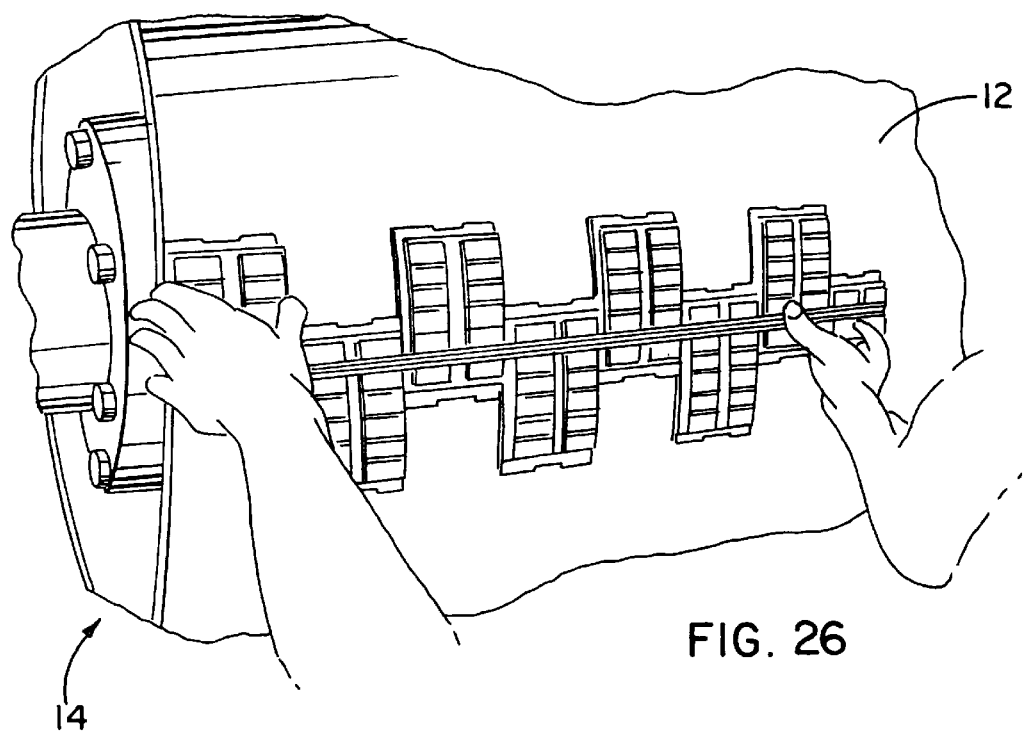
FIG. 26
FIG. 27
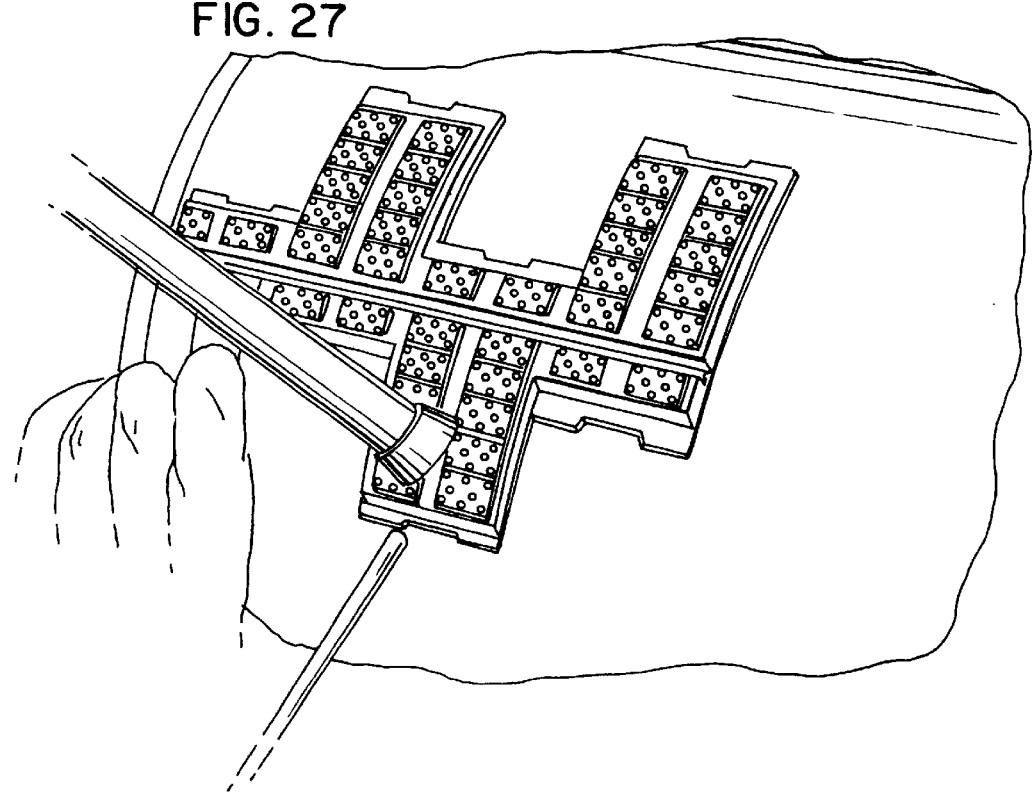

LAGGING SYSTEM FOR CONVEYOR BELT PULLEYS

This application claims the benefit of provisional application No. 60/173,755, filed Dec. 30, 1999.

FIELD OF THE INVENTION

The invention relates to a lagging system for conveyor belt pulleys and, more particularly, to lagging members having lagging material for providing traction between the face of pulleys and conveyor belts driven thereabout.

BACKGROUND OF THE INVENTION

Conveyor belt lagging systems are known for providing improved traction between the underside of the conveyor belt and the outer surfaces of the pulleys about which they travel. The belt lagging materials, which can include belt engaging raised rubber nodules or ceramic tiles for example, transmit the drive force from the drive pulley to the underside of the conveyor belt. Accordingly, the resistance to slippage under their applied drive loading is a primary consideration in the performance of conveyor belt lagging systems. The load carrying capability of belt lagging is affected by the operating conditions of the conveyor, such as moisture and/or the combination thereof with loose material that can generate mud or sludge-like materials at the lagging/belt interface. In addition, the type of belt, e.g. rubber plied or PVC, can affect the load carrying capability of lagging systems.

Another factor affecting the load carrying capacity is the application for which the lagging is used. In heavy duty applications in particular, the amount of drive force differential that is generated in the interface area between the conveyor belt and lagging material can become great enough to cause slippage of the conveyor belt. Specifically, the drive force change between the positions where the belt is incoming to and outgoing from the pulley is an important consideration as with lower coverages of lagging material about the pulley, it is generally assumed that such a differential will be larger potentially causing problems for the lagging system. A conveyor belt typically will undergo some contraction as it is driven around the drive pulley at the discharge end of the conveyor belt and loading thereon is progressively reduced. If the coverage of lagging is too low and/or poorly distributed on the pulley face, then the belt contraction can cause belt slippage which increases the loading on the pulley lagging. Increased loading if sufficiently high in terms of friction and sheer forces can damage the lagging material, and if enough heat is generated by excessive loading, can cause breakdown and degradation of the pulley lagging.

Applicant's assignee herein has a product called Flex-Lag® which utilizes strips of elastomeric material to serve as a rubber backing for ceramic tiles that are molded therein. The strips are generally in elongate form with a long length and a relatively narrow width such that when attached to the pulley drive surface, the length of the strip extends axially across the pulley surface. Herein, it will be understood that the direction straight across the pulley surface will be referred to as the axial or lateral direction extending between the lateral ends of the pulley which is also commonly referred to as the width of the pulley. When discussing elongate lagging strips, the length of the strips is intended to be run in the lateral direction when attached to the pulley surface; hence, reference can be made to the strips and other features thereof as extending in the axial or lateral directions which is along the length of the strip, or corresponding in most instances to the strip's longitudinal direction. Similarly, the direction about or around the pulley surface will be referenced as the circumferential direction which with elongate strips attached as intended to the pulley surface will run across the narrow width of the strips between the long sides thereof. In all instances, these reference directions/dimensions are intended to be consistent with standard industry uses and are otherwise consistent with normal understanding, and do not establish any significant variation therefrom. However, because a pulley's width is perpendicular to that of the attached lagging in elongate strip form, any inconsistencies that may be generated thereby should be readily clarified by the surrounding description and figures provided herein.

The ceramic tiles for Flex-Lag® extend continuously along the length of the strip. The ceramic tiles include small raised round-shaped nibs so that under normal belt compression, there are numerous nibs that embed themselves into the underside belt cover to virtually eliminate belt slippage even in the most extreme operating conditions. Generally, the higher the ratio of belt engaging ceramic tiles to the area on the pulley face about which the belt travels, the greater the load carrying capacity of the lagging material. However, the cost of the ceramic tiles is the most expensive component in the total cost for ceramic lagging products. A cost effective ceramic lagging product is needed that maintains acceptable load carrying characteristics despite the presence of harsh operating conditions.

The strips of the Flex-lag® product are installed by bonding them to the pulley face. To insure a proper fit about the pulley, longitudinally extending cutting sipes are provided between rows of the ceramic tiles to allow for the width of the strips to vary in a predetermined manner around the circumference of the pulley. As is apparent, the Flex-Lag® product can require significant pre-planning to obtain a proper fit of the strips about the circumference of the pulley. In addition, cutting the strips to a desired width is labor intensive. Despite the provision of the longitudinal cutting sipes, it is still possible for a worker to install the strips so that there is a gap left between the first attached strip and the last attached strip that is too small for a strip to be fit therebetween but larger than desirable for operation of the belt.

In this instance, the installation of the strips must be reworked, or otherwise the gap that is left between the strips causes several problems during the operation of the belt. If there is a long extended axial area across the face of the pulley having such a gap spacing so that the pulley surface is devoid of ceramic tiles therein, the belt will not be supported in this gap area increasing the likelihood of belt slippage under heavy loading. Further, as the pulley rotates and belt scrapers for cleaning the belt engage the unsupported belt as it travels past the laterally long, circumferentially wide gap in lagging material on the pulley face, the scraper, which is typically biased toward the belt and pulley, will push inward on the belt and engage hard against the trailing strip of lagging on the other side of the gap. This can cause bouncing of the scraper so that there is uneven cleaning of the belt and can be hard on belt splices as they traverse the gap on the pulley such as either where there are mechanical belt fasteners in place or where the belts are attached by a vulcanized splice. Chattering of the scraper or cleaner caused by long, wide gaps free of lagging material can create damaging impacts to the belt cover, and possibly to belt carcass as well.

Accordingly, a more general definition for when such an undesirable long lateral gap is present is when the belt is not rigid enough across the gap to resist inward deflection caused when the biased scraper blade is engaged therewith. Of course, where the blade is thicker than the gap, it will straddle the adjacent lagging strips and thus not cause the problems if it were of a thickness that allowed it to project into the gap. As a specific example, such gaps are generally understood as occurring where there is a circumferential spacing of greater than approximately ⅝ inch between lagging material on adjacent strips as between a trailing or rear edge of lagging material on a forward or leading strip and a leading or forward edge of material on a rearward or trailing strip.

Another lagging product is known that utilizes strips of lagging material tightly fit between laterally extending retainers that are bolted or welded to the pulley face circumferentially spaced thereabout. The lagging strips have a metal backing plate that projects beyond the lagging material bonded to the upper surface of the plate. One problem with the use of metal plates fit between metal retainers is that over time corrosion is likely to occur which can make it extremely difficult for a worker to slide the lagging strips between the retainers due to interference caused by the corrosion between the plates and retainers. Often, this leads to workers simply tack welding the metal backing plate directly onto the pulley face to avoid the difficulties that can be created during installation using the retainers. In either case, extremely careful preplanning needs to be undertaken before the processes of attaching the strips and the retainers to the pulley face begins. Further, even if properly fitted about the pulley, the retainers create the previously-described undesired long, wide gaps as, in contrast to the lagging material, the retainers do not project very high above the surface of the pulley as they are not designed to engage and provide a traction surface for the belt. Thus, the retainers define a laterally extending gap area across the pulley face that does not include belt supporting lagging material. This problem is exacerbated where the retainers are not used and the strips do not properly match up at the end of the installation process as previously described so that large gaps between the first and last applied adjacent strips, for instance, can be created. Another drawback of the metal backed lagging product is its inability to be used with a large range of different circumference pulleys because of the rigidity of the metal backing plate.

Another problem is in attaching the lagging strips to the pulley surface, particularly where a weld attachment is to be used with lagging strips that have a metal carrying or backing plate. Specifically, installers of lagging will use a variety of tack or spot welding and straight welding methods where weld beads are formed to respectively hold the strip to the pulley surface and then to complete the attachment of the strip. Those weld attachments are usually created at inconsistent positions along the length of the strip simply based on the welders assessment of whether there is sufficient bond to the pulley surface to hold the strip. Moreover, installers do not want to have to strike their welding arc more than they have to weld a strip to the pulley face. In addition, installation speed often creates irregular or sloppy welding. To accommodate for this, welders need sufficient surface on the pulley available next to the backing plate portions of the lagging strip projecting beyond the lagging material for creating the weld attachment therebetween. This can exacerbate the above-discussed problem of having unduly long and wide gaps between the lagging material on strips attached adjacent to each other on the pulley surface.

Accordingly, there is a need for an improved conveyor belt lagging system that avoids creating the above-described problems of having unduly long, wide gap areas between lagging material on adjacent lagging strips. Further, a lagging system that can be easily installed and used with a larger range of different circumference pulleys would be desirable. In addition, a lagging system that provides for an improved attachment structure to the pulley is needed.

SUMMARY OF THE INVENTION

In accordance with the present invention, a lagging system for use on pulleys for conveyor belts is provided that is improved in terms of the ability to avoid the creation of long gaps in lagging material extending across the face of the pulley during installation as can be created with prior lagging systems. More particularly, the present lagging system includes lagging members carrying lagging material thereon which define leading and trailing edges thereof in terms of the direction of rotation of the pulley to which they are attached. These edges have a configuration such that when attached to the pulley, they do not extend straight or linearly across the pulley in the axial or lateral direction. In this manner, adjacent members can be attached to the pulley surface with the respective lagging material edges thereof in facing relation so that they avoid creating the aforedescribed unduly long gaps in lagging material between the lagging members. Because the lagging material does not extend linearly in the lateral direction along its edge, the respective edges can be interfit with each other much in the way of a puzzle so that no such large or long gaps therebetween are created. Moreover the degree of interfitting or mating between the edges can also be adjusted so that while some space can be created between the facing edges of adjacent members, a single, long continuous gap extending across the pulley face will still be avoided.

The present invention also contemplates an improved configuration for the backing plate that supports the lagging material and is attached to the pulley surface. The outboard portions of the plate that extend or project beyond the lagging material also have leading and trailing edges in terms of the direction of rotation of the pulley. The outboard portions include recesses that are spaced along the edges to provide an easily identifiable attachment location and, in one form, a weld location. The recesses preferably occur at predetermined consistently spaced intervals so that when adjacent strips are attached to the pulley, the recesses from one strip are aligned with the recesses from another adjacent strip for forming an easily identifiable attachment slot therebetween. It is preferred that the recesses include a backmost edge portion that extends linearly as this allows for ease in welding of the outboard portions to the drive surface. With a linear weld edge, a welder does not have to undergo a significant readjustment of their position or that of the welding electrode or torch as they weld the various weld edges along the lagging strip. Moreover, the length of the weld edge can be predetermined to correspond to that of the maximum length of the weld needed in one of the recesses. In this manner, the welder is not left to guess as to whether or not a sufficient weld attachment has been created between the lagging strip and pulley.

Accordingly, in one form of the present invention, a lagging system is provided for transmitting drive forces between surfaces of pulleys and conveyor belts that extend in a circumferential direction around the pulley and in a lateral direction across the pulleys substantially perpendicular to the circumferential direction. The lagging system includes a plurality of lagging members for being attached on the pulley surface and having lagging material for engaging the underside of conveyor belts. The lagging material defines leading and trailing edges thereof where at least one of these edges has a predetermined configuration that is other than linear in the lateral direction to allow adjacent lagging members to be attached to a pulley surface with the at least one edge thereof extending transverse to the lateral direction and in facing relation to each other. Due to the nonlinear configuration of the edges, the lagging members can be attached to the pulley surface with there being spacing between the facing edges of the lagging material that would otherwise be undesirable if this spacing or gap between the edges continued straight across the pulley face in the lateral direction. With the lagging system herein, such spacing will not create the undesired linear gaps in lagging material providing for smoother conveyor belt operations, as well as providing for ease in installation in terms of fitment of the lagging members about the pulley surface as will be discussed more fully herein.

The predetermined configuration of the one edge can be crenellated, oblique, or stepped.

In one form, the lagging system can include lagging strips that have lagging material such as in the form of ceramic tiles thereon. In the crenellated form, projecting portions are provided on the lagging strips which extend in the circumferential direction and which can be substantially aligned in the circumferential direction with or interposed between projecting portions of adjacent lagging strips. The projecting portions include lagging material thereon so as to avoid any extended areas across the pulley face that are devoid of lagging material for supporting and transmitting torque to the underside of the belt thereby. Preferably, the interposed projecting portions of adjacent lagging strips have lagging material that overlap in the circumferential direction to further reduce the areas lacking ceramic lagging material on the pulley face. In this manner, the present invention including the projecting portions avoids the creation of the aforedescribed gaps or lagging-free areas on the pulley face and the attendant problems therewith. In other words, the lagging system herein provides for smoother conveyor belt operations between belt cleaners and belt splices, whether they are vulcanized splices or splices formed with mechanical belt fasteners, and between the conveyor belt itself and the lagging material.

In another form of the invention, a lagging strip is provided for being attached across a drive surface of a pulley to transmit drive forces between the pulley drive surface and conveyor belt extending thereabout in engagement with the strip. The lagging strip includes lagging material for engaging the belts and a backing plate for supporting the lagging material and being attached to the pulley surface. Outboard portions of the plate extend beyond the lagging material and define leading and trailing edges thereof. Recesses in the outboard portions occur at predetermined consistently spaced intervals along the edges to allow adjacent strips to be attached to the pulley surface with the recesses from one strip aligned with the recesses from another adjacent strip for forming an easily identifiable attachment slot therebetween. Unlike prior systems where attachments as by welding could occur randomly and thus irregularly along the lagging strip, the strip herein provides an aid to the end user in installation so that they know exactly where the attachments of the strip to the pulley surface is to take place.

In a preferred form, the backing plate is of a metallic material and the recesses include a backmost edge that extends linearly to provide ease in welding of the outboard portions to the drive surface. The linear weld edge makes the welding job substantially easier as the welder does not have to significantly readjust the position of the welding tools, e.g. torch and/or welding material, from one weld edge to the next.

The backmost edge can have a predetermined length which corresponds to the maximum length of the weld needed in one of the outboard portion recesses. In this manner, the weld edge avoids unnecessary welding in terms of that needed to attach the strip to the weld surface.

Further, it has been found that with the lagging strips, preferably including the projecting portions herein, the number of ceramic tiles can be decreased without a corresponding decrease in the load carrying capacity including the coefficient of friction between the belt and tiles. The ceramic lagging product including the small raised nibs described herein actually project or embed themselves into the resilient material belt cover adjacent to the pulley to provide a mechanical interlock therebetween. Accordingly, the ceramic lagging needs to be highly resistant to shear forces, as well as providing high drive force between the tiles and belt. Thus, the load carrying capacity of ceramic lagging is derived from the ability to resist shear loading due to differential drive force and to the level of drive force developed between the lagging and belt. By having the desired lateral coverage of the tiles on the face of the pulley at all positions around its circumference such as with the present lagging strips with projecting portions, the torque transmitted from the tiles to the belt will still be distributed across the full face of pulley and hence the full width of the belt.

Accordingly, the invention also contemplates a ceramic lagging system that utilizes an optimal amount of ceramic tiles to maximize the load carrying capability of the system while still providing a cost-effective product. To this end, it has been found that the ceramic tile coverage can be reduced below full or 100 percent coverage without a significant loss in load carrying capability. A minimal range of coverage has also been identified where the low percentage coverage of ceramic tiles causes performance problems, as more fully discussed hereinafter. These upper and lower ranges generally may be shifted upwardly or downwardly based on the application and the loading the lagging system must be able to handle. For instance, in heavy-duty applications the ranges will be higher while in lighter duty applications the ranges may be lower.

Although the lagging material described herein is ceramic, it will be recognized that alternate materials can be utilized. For instance, in certain applications, rubber and even material from the conveyor belt can be used as the lagging material.

Accordingly, in another aspect of the present invention, a lagging system is provided for attachment to a pulley that rotates about a drive axis and has a drive surface with a predetermined surface area having a conveyor belt engaged and extending thereabout. The lagging system includes a plurality of lagging strips for being attached about the pulley drive surface. Carrying members of the lagging strips are secured to the pulley surface. Lagging material is supported by the carrying members for transmitting drive forces to the conveyor belt traveling about the pulley. An outer periphery of the carrying members is provided with a predetermined configuration that allows adjacent carrying members to be arranged so that unduly long axially extending gaps between lagging material on the adjacent carrying members are avoided and to optimize distribution of force transmitting interfaces defined between the lagging material and the belt while keeping the surface area coverage of the lagging material relative to the pulley drive surface to a minimum. In this manner, secure drive force transmission is provided with the present system while at the same time not requiring as much lagging material, i.e. expensive ceramic tiles, to achieve this result as in prior systems.

In a preferred form, the outer periphery of the carrying members has a generally crenellated configuration so that the strips include projecting portions with lagging material thereon to provide a checkerboard distribution of lagging material on the pulley.

The lagging material can be of a ceramic material, and the surface area coverage of the ceramic material can be in a range of approximately 40 to approximately 60 percent.

The projecting portions also allow for significant flexibility in attaching such as by welding or bolting the present lagging strips about the circumference of the pulley. As mentioned, prior lagging systems can require the width of the strips be adjusted by cutting along sipes to obtain proper fitment which can be a laborious task and/or systems such as the weld-on retainer system or direct welding of metal backing plates to the pulley face require significant preplanning with respect to the number of strips to be used for particular circumferences of pulleys and their position and/or the precise position of the retainers used therewith. In the present system, cutting of the circumferential width of the strips is not necessary and although some degree of pre-planning is desirable, there is room for imprecision in the placement of the strips on the pulley face as the degree of the mesh between the projecting portions can be adjusted as the strips are being attached onto the pulley face so that the first and last attached strips are still arranged with the projecting portions interposed. To this end, the lagging material on the projecting portions can still overlap in the circumferential direction to avoid creating long gaps between lagging material on adjacent strips while also simplifying and easing the installation process.

Thus, the present invention also contemplates a method for attaching and fitting lagging strips onto a generally annular drive surface of a conveyor belt pulley. The method includes providing a plurality of elongate lagging strips having projecting portions with lagging material thereon which define a fitment space therebetween, attaching the lagging strips to the pulley drive surface so that the projecting portions extend circumferentially on the surface, fitting strips adjacent to each other on the drive surface during said attaching of the lagging strips so that projecting portions of one of the strips are aligned with the fitment spaces between projecting portions of an adjacent other one of the strips, and adjusting the degree to which the projecting portions of adjacent strips are fit into the aligned spaces during said fitting of the adjacent strips to avoid having unduly long continuously extending axial gaps across the drive surface formed between lagging material of adjacent strips and for providing an optimum level of coverage of the lagging material on the drive surface.

In a preferred form the lagging strips include a metallic backing plate having outboard portions for being welded to the pulley surface, and the fitment of projecting portions into aligned spaces between adjacent strips is such that the projecting portions are substantially fully mated therein. The method further includes welding along a linear weld edge in a recess on the outboard portions to limit the number of independent welding operations for attaching one of the strips to the pulley surface. In a preferred form, the method includes aligning recesses of the outboard portions of adjacent strips closely together as an incident of the fitment for substantial mating of the projecting portions, and exposing an easily identifiable portion of the pulley surface between the aligned recesses for welding of the outboard portions to the pulley surface.

Another aspect of the invention is the use of a carrying member of a rigid material, that in a preferred form is a metal backing plate, for carrying the lagging strip and for being welded to the pulley face wherein apertures or openings are provided in the body of the plate. These openings increase the flexibility of the backing plate which allows it to more readily conform for being welded or bolted onto different circumference pulleys or on pulleys which are crowned across their width, rather than flat. Further, the thickness of the plate can be larger than otherwise would be allowable for a solid backing plate for use on a particular circumference pulley so that a better welded attachment can be obtained with the present apertured backing plate. The apertures can also be used for mechanically locking the elastomeric material of the lagging strips therein. In this regard, the elastomeric material which has the ceramic tiles molded or embedded therein is bonded to the plate with portions thereof bonded in the openings. These portions of elastomeric material in the openings provide a mechanical lock of the elastomeric material to the plate in addition to the vulcanized bond. The mechanical lock of the rubber portions in the plate openings provides improved resistence to the applied shear loading the lagging strips experience during operation of the belt.

In one form, the backing plate has small sized welding tabs that more efficiently use the space on the pulley face between the strips for welding thereto. Typically lagging strips carried by a metal backing plate generally just extend the plate out from under the elastomeric material carried by the plate so that a long laterally extending straight portion extends out from under the rubber for being welded to the pulley face. The present tabs allow the amount of metal material on the straight portion of the backing plate that projects out from under the supported rubber to be minimized or eliminated as it is not needed for bonding to the pulley face thereby allowing the lagging material of adjacent strips to be disposed closer to each other. In one form, with the lagging strips in position to be welded onto the pulley face, the small tabs can be provided with a lateral size that is equal to or less than the lateral space between tabs of adjacent strips. In this manner, there is at least as much surface area on the pulley face as on the tabs for creating the welded attachment therebetween. Alternatively, the small welding tabs can have a triangular form. In the preferred form where the lagging strip includes projecting portions, the tabs can extend out from the projecting portions either centrally therefrom or on either end thereof. This allows the tabs to be positioned between or on either side of tabs of adjacent lagging strips so as to minimize the spacing in the circumferential direction between the lagging material thereon.

BRIEF DESCRIPTION OF THE DRAWINGS

FIG. 8 is a plan view of the backing plate of FIG. 6 showing an outer periphery thereof having a generally crenellated configuration;

FIG. 9 is a perspective view of a lagging strip having the backing plate of FIG. 8 underlying the rubber carrying material and ceramic tiles thereover;

FIG. 10 is an elevational view of the lagging strip of FIG. 9;

FIG. 15 is an enlarged plan view of a pair of adjacent lagging strips showing the position of the projecting portions thereof;

FIGS. 17A–17C are side elevational views similar to FIG. 16 showing the lagging strip including a curved backing plate applied to pulleys with different diameters;

FIG. 18A is a plan view of an alternate form of lagging strips in accordance with the present invention showing a larger number of ceramic tiles on projecting portions thereof;

FIG. 18B is a plan view of a pair of the lagging strips of FIG. 18A showing the overlap in the circumferential direction of the ceramic tiles between the projecting portions of the respective lagging strips;

FIG. 18C is an enlarged view of adjacent projecting portions of the strips of FIG. 18B showing small welding tabs for attaching the lagging strips to the pulley face;

FIG. 19 is a plan view of another alternative form of lagging strips in accordance with the present invention having generally triangular-shaped welding tabs;

FIGS. 20B–20D are plan views of the backing plate of FIG. 20A having openings therein to increase its flexibility for conforming to different circumferences and types of pulleys;

FIG. 21 is a plan view of a backing plate having openings for lagging strips similar to those of FIGS. 18A–18C without the provision of welding tabs;

FIGS. 24A and 24B are perspective views of alternative lagging systems in accordance with the present invention showing lagging members with lagging material defining nonlinear trailing and leading edges thereof relative to the axial direction across the pulley surface with the edges having a oblique and stepped configurations, respectively;

FIG. 25 is a plan view of an alternative lagging strip showing projecting portions thereof abutted against projecting portions on an adjacent strip with weld slots formed between aligned weld recesses; and FIGS. 26–29 are perspective views of an installation of the lagging system of FIGS. 1–10 on a pulley.

DETAILED DESCRIPTION OF THE PREFERRED EMBODIMENTS

Figure 28:
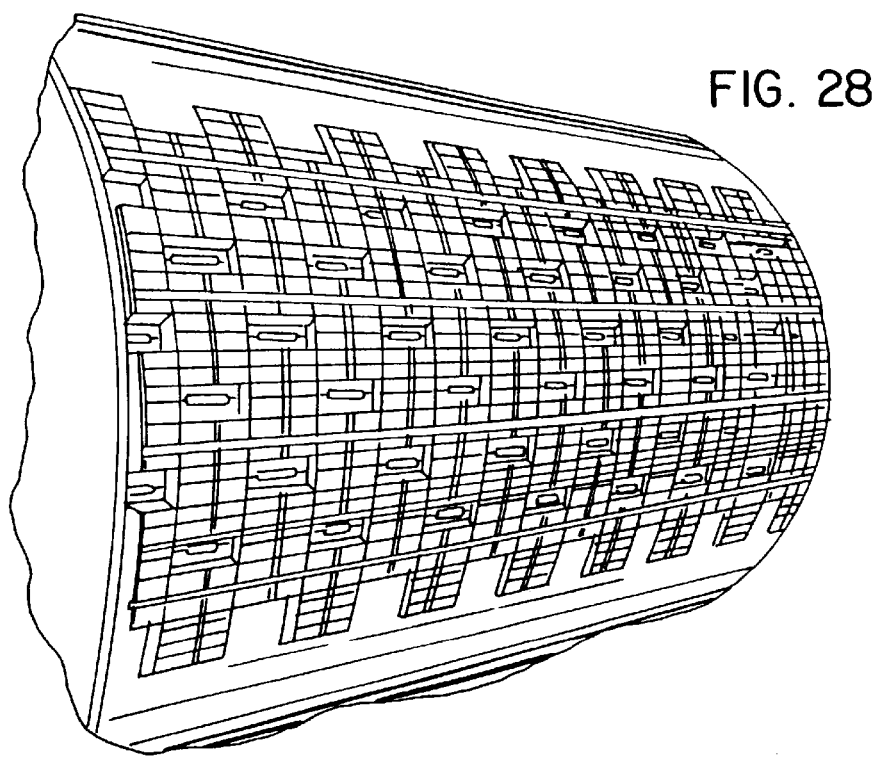

In FIGS. 1, 2 and FIGS. 12, 13, lagging systems 10 and 200, respectively, are shown attached to a drive surface or face 12 (FIGS. 26–28) of a pulley 14 for a conveyor belt (not shown). As is known, lagging is utilized to provide improved traction between the conveyor belt and the pulleys 14 of a conveyor belt drive system so that torque drive force is efficiently transmitted to the belt, i.e. with a minimum of belt slippage.

The drive surface 12 for pulleys 14 generally will take on an annular configuration. Pulley 14 can have ends 16 and 17 between which the drive surface 12 extends and a drive axis 14a about or around which the pulley surface 12 is oriented. Accordingly, there is a lateral or axial direction 18 defined linearly straight across the pulley surface 12 and which is coplanar with the drive axis 14a. A circumferential direction 19 is defined perpendicular to the lateral direction 18 in which the drive surface12 extends about the drive axis 14a. Thus, the circumferential direction 19 is the direction of rotation of the pulley 14 about the drive axis 14a.

The illustrated lagging systems 10, 200 of FIGS. 1, 2 and 12, 13, respectively, utilize lagging members in the form of elongate strips 26 and 216 that are attached to the pulley face 12 with the strips 26 and 216 carrying lagging material 28 and 218 thereon for engaging the conveyor belt in a secure manner without slipping. Accordingly, it is generally true that the larger the surface area of engagement between the lagging material 28, 218 and the belt, the greater the load carrying capacity therebetween and thus the traction on the belt driven by the lagging material 28, 218 attached on the pulley face 12 via the lagging strips 26, 216. In the preferred and illustrated form, the lagging material 28, 218 is in the form of ceramic tiles 20 provided with small raised nibs 22 which embed themselves in the lower cover of the conveyor belt during operation thereof. As in applicants' assignee's Flex-Lag® product, the ceramic tiles 20 are molded in an elastomeric rubber carrying material 30 and 224 which, in turn, is bonded to a carrying member 32 and 226 in the form of a metal backing plate for the lagging systems 10 and 200, respectively. Where exposed between and around tiles 20, the rubber material 30, 224 can act as lagging material in providing a friction surface of engagement with the belt as needed since the upper surface of the material generally is at a level only slightly below the nibs 22. This is particularly true of belts having higher levels of contraction, i.e. rubber covered belts or the like, where the engaged belt surface is more likely to work its way down beyond the nibs and to the tile upper surface and the upper surface of the rubber carrying material during such contraction.

As mentioned, the lagging members in the form of elongate strips 26 and 216 are provided with a long length and an effective width, which will be described more fully herein, such that when attached to the pulley surface 12, the length of the strips 26, 216 extends axially or in the lateral direction 18 across the width of the pulley 14 with the ends of the strips on the pulley surface 12 adjacent to the pulley ends 16 and 17. Accordingly, the width of the elongate strips 26, 216 will extend in the circumferential direction 19. Manifestly, other configurations for the lagging members are also contemplated as being within the scope of the present invention such as members that have a greater effective width in the circumferential direction 19 than their length in the lateral direction 18.

Figure 7:
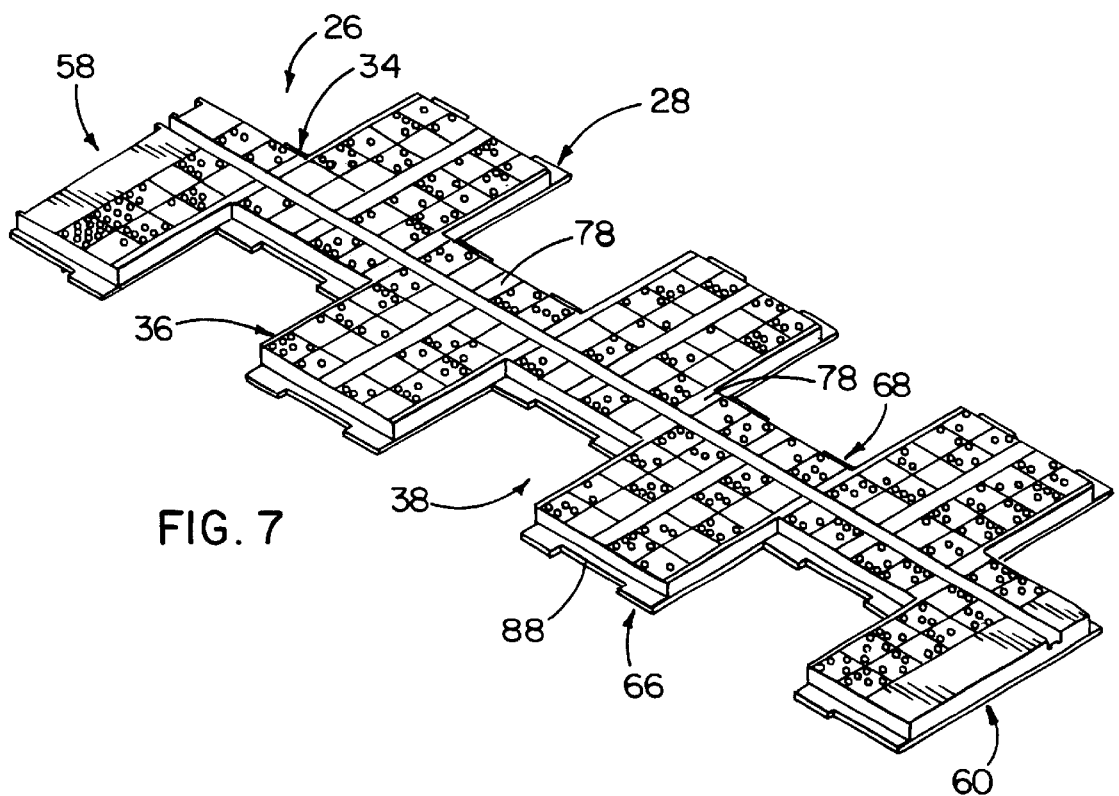
FIG. 7 is a perspective view of a flat lagging strip showing the carrying material extending beyond the ceramic tiles at either end of the strip.

As illustrated, the lagging strips 26, 216 herein are provided with a main elongate portion 34, 228 with projecting portions 36, 230 extending at spaced intervals thereaolong. The main elongate portion 34, 228 and the projecting portions 36, 230 extending therefrom both include ceramic tiles 20 thereon, as shown in FIGS. 7 and 15. The strips 26, 216 including the metal backing plate 32, 226 are welded attached to the pulley face 12, as shown in FIGS. 1, 2 and 12, 13. In this regard, the projecting portions 36, 230 provide significant advantages during the installation and fitment process as well as during operation of the conveyor belt over prior lagging systems. During installation, the projecting portions 36, 230 allow adjacent strips 16 to be interfit or mated with each other by interposing the projecting portions 36, 230 thereof into fitment spaces 38, 232 between spaced projecting portions 36, 230 of circumferentially adjacent ones of the strips 16. As the projecting portions 36, 230 can be inserted into the spaces 38, 232 of adjacent strips 26, 216 to more or less of a degree of overlap in the circumferential direction, indicated by arrow 19, the fitment process of the strips 26, 216 on the pulley face 12 is greatly simplified. Accordingly, if a worker is installing the strips 26, 216 (as shown in FIGS. 26–29 for strips 26) and determines that the space remaining on the pulley face 12 in direction 19 to be covered by the strips 26, 216 does not fit the number of strips 26, 216 they had anticipated, the degree of the overlap between the projecting portions 36, 230 can be adjusted to accommodate a greater number of strips 26, 216 or a lesser number of strips 26, 216, as the case may be (see FIG. 29 and the greater circumferential spacing between strips 26a and 26b over the other strips in substantial full mating relation, for example). This flexibility in the fitment process is a great improvement over prior lagging systems that either lack flexibility entirely or require labor-intensive cutting of the circumferential width of the strips to attempt to accommodate the space remaining on the pulley face 12 as the worker nears the end of the installation job.

Generally, it has been found that by having lagging members that carry lagging material 28, 218 thereon so as to define edges 40, 235 so that there is at least one of these edges that does not extend linearly in the lateral direction 18, there is the advantage of allowing adjacent lagging members to be attached to the drive surface 12 with respective nonlinear edges 40, 235 in facing relation such that axially long and circumferentially wide gaps in the lagging material 28, 218 of adjacent lagging members are not created. With respect to the lagging strips 26 and 216, such edges 40 and 235 are defined as following the outermost periphery of the ceramic tiles 20 on the respective projecting portions 36, 230 and the portion of the main elongate portion 34, 228 recessed between the projecting portions, despite some discontinuities therebetween depending on the exact placement of the tiles 20 in the rubber carrying material 30, 224. Also, although the tiles 20 are generally aligned with the rubber material at the non-linear leading and trailing edges as defined above, some slight amounts of rubber can be present on the tiles at these edges as an incident of the molding process. As is apparent, by having the nonlinear edge 40, which is either a leading or trailing edge as the pulley 14 rotates depending on its orientation when the strip is attached to the pulley drive surface 12, the gap between the lagging material 28, 218 is adjustable and can be greater than that otherwise desired if such a gap were to extend linearly in the lateral direction 18 across substantially the entire extent of the drive surface 12 as can be created in prior lagging systems.

It is anticipated that various configurations for the nonlinear lagging material edge 40 can be utilized. For instance, the nonlinear edge can be defined by a lagging material such as on the strips 26 and 216 so that the edge 40 has a crenellated configuration. Alternatively, the nonlinear edge can be as shown schematically in FIG. 24A or 24B. In FIG. 24A, the edge 42 extends obliquely to the lateral direction 218, and in FIG. 24B the edge 44 has a stepped configuration.

As can best be seen in FIGS. 2, 15, 24A and 24B, with each of the nonlinear edges 40–44, lagging members can be attached to the pulley 14 without creating unduly long and wide axially or laterally extending gaps between lagging material on adjacent members. With respect to the strips 26 and 216 there can be seen short laterally extending gaps 46 that are formed between the strips but which are separated from other such gaps 46 by lagging material so that together they do not define the long, laterally extending gaps that would allow a scraper blade 48 to deflect the conveyor belt inwardly and engage hard against the trailing strip. The same is true of the schematically depicted lagging members having the oblique edges 42 and stepped edges 44.

In terms of the degree of mating or interfitting of the projecting portions 36, 230 in fitment spaces 38, 232, the present lagging systems 10, 200 would also more readily allow for the strips 26, 216 to be attached so that the lagging material 28, 218 at the edges 40, 235 thereof are not overlapping in the circumferential direction and instead are aligned with or slightly spaced from the lagging material edge on an adjacent one of the strips, if needed. If attached so that there is a spacing in the circumferential direction 19, this can be sized so that there will be no deflection of the belt by the scraper blade 48 when it passes thereover. Such spacing will take into account the type of belt being used as a stronger more rigid belt can be supported over a greater spacing between lagging material without deflection, as well as the thickness of the blade 48 itself as with lateral gaps smaller than the blade thickness, there will be no concern with respect to the belt deflecting, since the blade will span the gap.

In this regard and referring to lagging system 200 specifically, depending on the degree of the circumferential overlap between projecting portion 230 of adjacent strips 216, it is possible that the lagging material or ceramic tiles 20 on the overlapping projecting portions 230 may not themselves be overlapping such that there are small lateral interruptions in the lagging material 218 for engaging and driving the underside of the conveyor belt. As can be seen in FIG. 15, it is shown that the ceramic tiles 220a on projecting portion 230a of strip 16a do not overlap in the circumferential direction 19 with the tiles 220b on projecting portion 230b of adjacent lagging strip 216b despite the overlap of the projecting portions 230 themselves. This is due to the spacing of the tiles 20 back from the periphery of the carrying material 224, as well as the outboard portion 246 of the backing plate 226, which will be described more fully herein. However, as long as the spacing between the lagging material 218 on adjacent strips 216 is kept below the maximum amount as described earlier, there will be no problems in terms of belt operations relating to belt cleaner chattering or the like.

Further, it has been found that even with the reduction in the lateral coverage of the tiles 20 using the present strips 216 attached onto the pulley face 12, there is not a corresponding drop-off in the load carrying capacity including the coefficient of friction obtained between the conveyor belt and lagging material 218 so that there is still maintained secure traction therebetween. Thus, the present lagging strips 216 provide a combination of an easier installation process and they avoid creating unduly long and wide gaps in lagging material on adjacent strips to improve respectively the installation time in applying and replacing lagging strips 216 on the pulley face 12 and the operation of the conveyor belt and peripheral mechanisms associated therewith, i.e. belt scrapers and splices.

In addition, in order to facilitate the mating or interfitting of the projecting portions 36, 230 in the fitment spaces 38, 232, the carrying members or backing plates 32, 226 are provided with an outer periphery that has a predetermined configuration which preferably substantially follows that of the lagging material 28, 218. More particularly, the backing plates 32, 226 include outboard portions 50, 246 that extend beyond the lagging and rubber carrying materials of the respective strips 26, 216, in particular beyond the edges 40, 235 thereof. The strips 26, 216 are attached to the pulley drive surface 12 at the outboard portions 50, 246, and in a preferred form as seen with outboard portions 50, they are provided with specialized attachment structure, as will be discussed more fully hereinafter. The attachment structure will cause the outer periphery to slightly deviate from the precise configuration of the outer peripheral configuration of the lagging and rubber carrying materials of the strip 26, and in particular that provided by the lagging material edges 40. Nevertheless, these outboard portions 50, 246 are constructed so as not to significantly affect the ability of the strips projecting portions 36, 230 to be interfit into a substantial full mating relation in the fitment spaces 38, 232, i.e. they do not project very far beyond the materials they carry.

Figure 3:
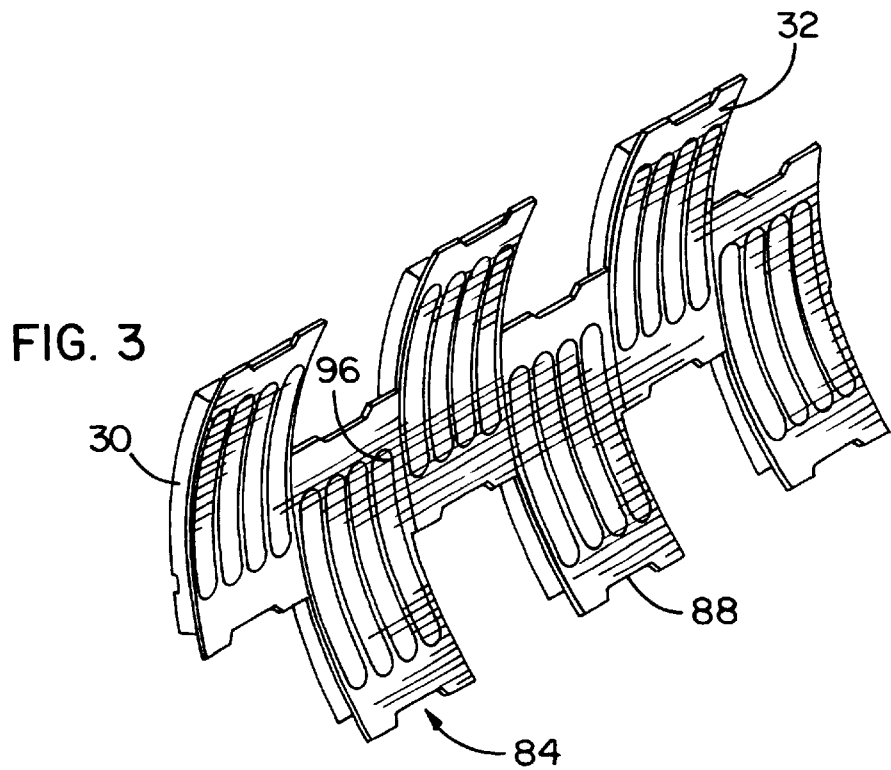
FIG. 3 is a perspective view of the lagging strips showing a predetermined curvature provided thereto and its backing plate having openings filled with a rubber carrying material.
Figure 6:
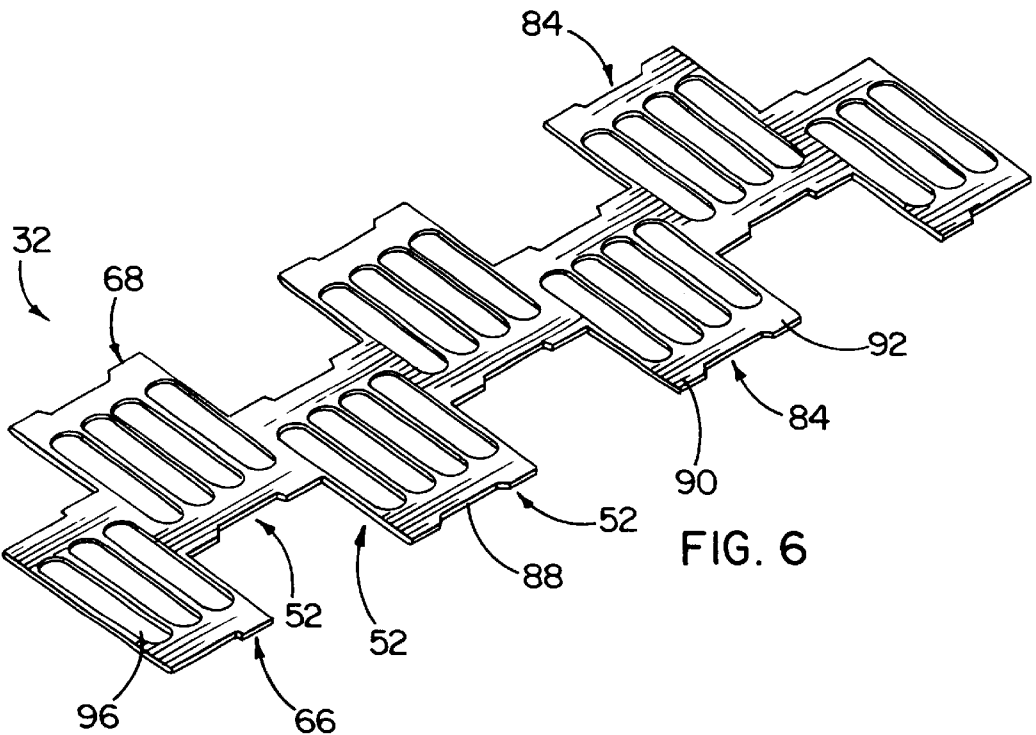
FIG. 6 is a perspective view of a flat backing plate showing openings and attachment recesses formed therein.

Accordingly, as can be seen by reference to FIGS. 3, 6 and 8 for example, the outer periphery, generally designated with reference number 52, of the backing plate 32 depicted in those figures has a generally crenellated configuration, save for the specialized attachment structure provided thereon at the outboard portions 50.

To provide a cost-effective ceramic lagging system 200, the reduction in tiles 20 as a percentage of the coverage thereof on the pulley face 12 provided by the present invention is a significant advantage. More particularly, bench testing has shown that with ceramic lagging the tile coverage can be reduced to approximately 50 percent of the ceramic lagging currently used with the previously-described Flex-Lag® product without significantly affecting the load carrying capability provided to the conveyor belt system in most cases. This includes testing with both rubber plied and PVC belts under various loading, and varied operating conditions, i.e. wet and dry. It has been found that ceramic lagging is particularly more effective with lower tile coverage than rubber lagging where the conveyor belt construction is of PVC material. This is because rubber lagging tends to pick up more residue matter, e.g. dirt and belt or lagging particles, lowering the coefficient of friction and lacks the ability of the ceramic nibs 22 to provide a type of mechanical lock with the belt. On the other hand, the lower coverage of ceramic tiles 20 also increases the level of the shear stresses on the tiles 20 via their nibs 22. One problem this creates is that at a certain low threshold level of coverage, once slippage between the tiles 20 and belt begins, the nibs 22 tend to rip or tear the lower cover which can also potentially cause damage to the belt carcass as well. In addition, at the low threshold coverage level, the tiles 20 start to separate from the rubber carrying material 224 and/or the material 224 can begin to fail due to the stresses at the interface between it and the embedded tiles 20. Through the above-mentioned bench testing, this threshold low level of tile coverage is approximately 25–40 percent. At levels below the threshold low level, the reduction in ceramic coverage becomes too great and failure of the lagging system occurs. Accordingly, the lagging system 200 of the present invention contemplates an optimal reduced coverage level or range of ceramic tiles 20 while avoiding the above-described negative consequences seen at the threshold low coverage level. Manifestly, the optimal reduced coverage level of the present invention can vary depending on the severity of the application for which the lagging system 200 is used, as previously mentioned.

With the lagging system 10 attached to a pulley 14 having a thirty-six inch diameter and a thirty-six inch drive surface width in the lateral direction 18, the surface area coverage provided by the lagging material 28 can be in the range of approximately 40 percent to approximately 60 percent relative to the surface area of the pulley surface 12. At the lower end of the range, the lagging strips 26 are attached to the pulley surface 12 so that the projecting portions 36 are circumferentially aligned or tangent at their outermost edges with projecting portions 36 on an adjacent strip 26. In other words, the degree of interfit is at its minimum, which is to say that the projecting portions 36 or at least the tiles 20 thereon of adjacent strips are not in overlapping relation to each other in the circumferential direction 19. On the other hand, at the upper end of the range, the projecting portions 36 are substantially fully mated into the fitment spaces 38 of the adjacent strip 26 so that there is maximum overlap of the projecting portions 36 of adjacent strips 26.

Figure 1:
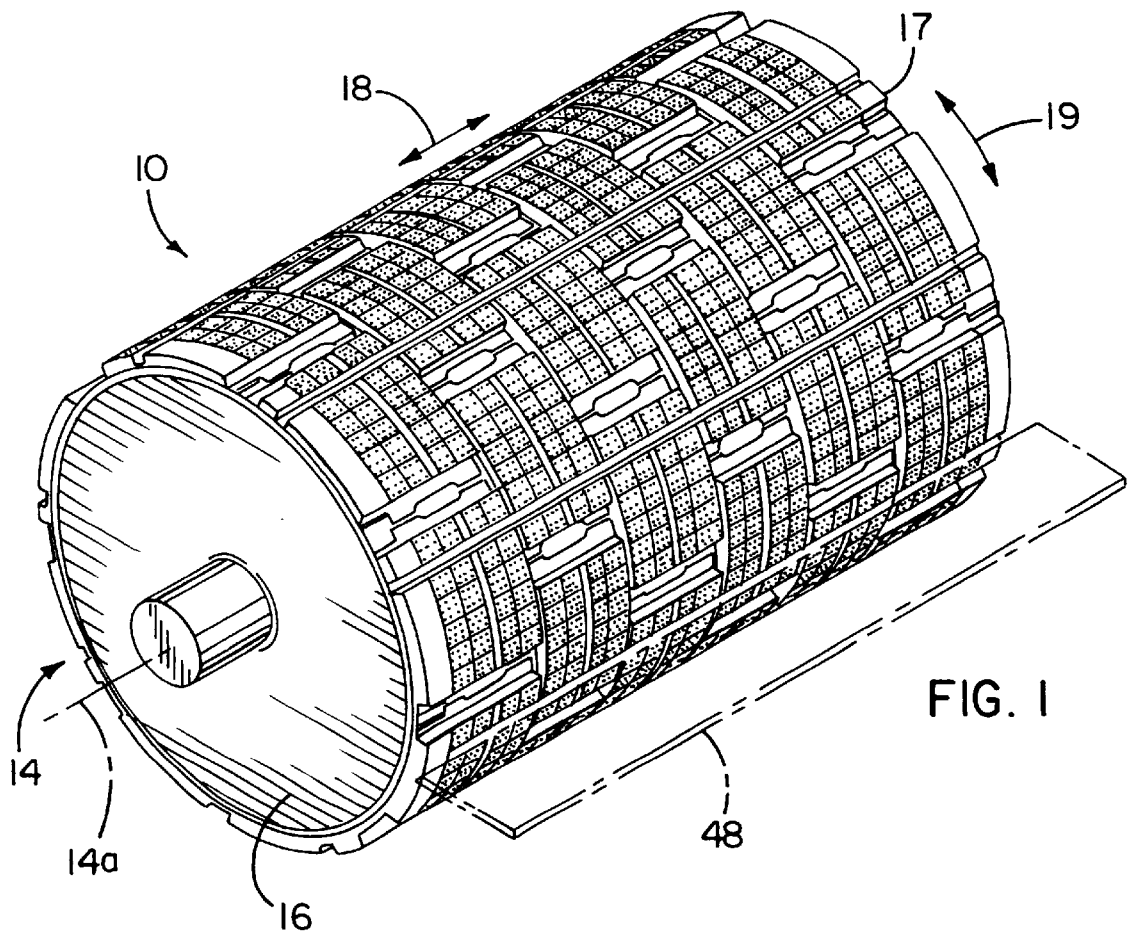
FIG. 1 is a perspective view of a lagging system in accordance with the present invention showing a conveyor belt pulley having lagging strips attached to the drive surface of the pulley, the lagging strips each including projecting portions and a backing plate with attachment or welding recesses formed therein.
Figure 2:
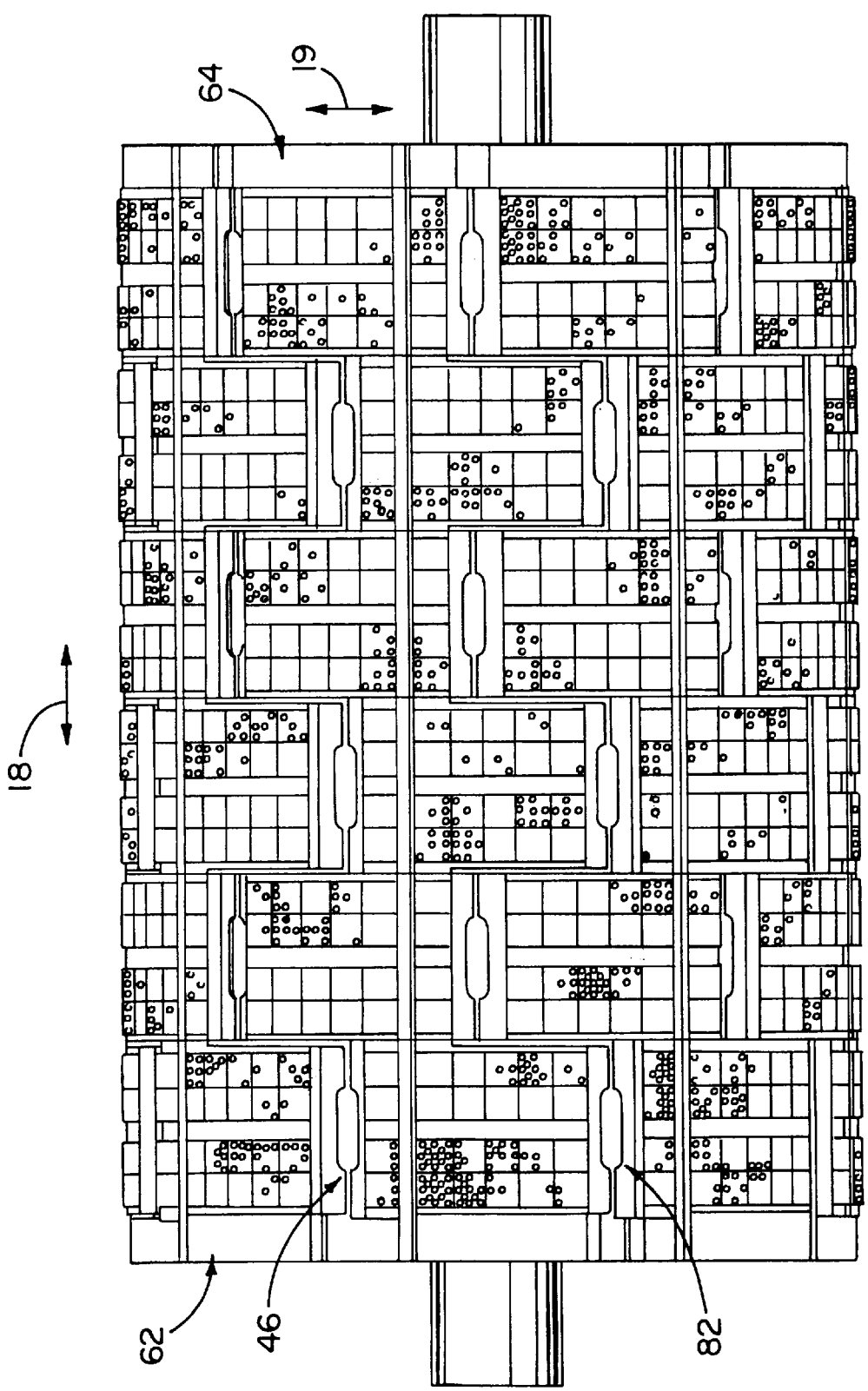
FIG. 2 is an elevational view of the lagging system of FIG. 1 showing the projecting portions on the lagging strips in mating relation between projecting portions of the lagging strips adjacent thereto and with the weld recesses of adjacent strips aligned to form weld slots therebetween.
Figure 4:
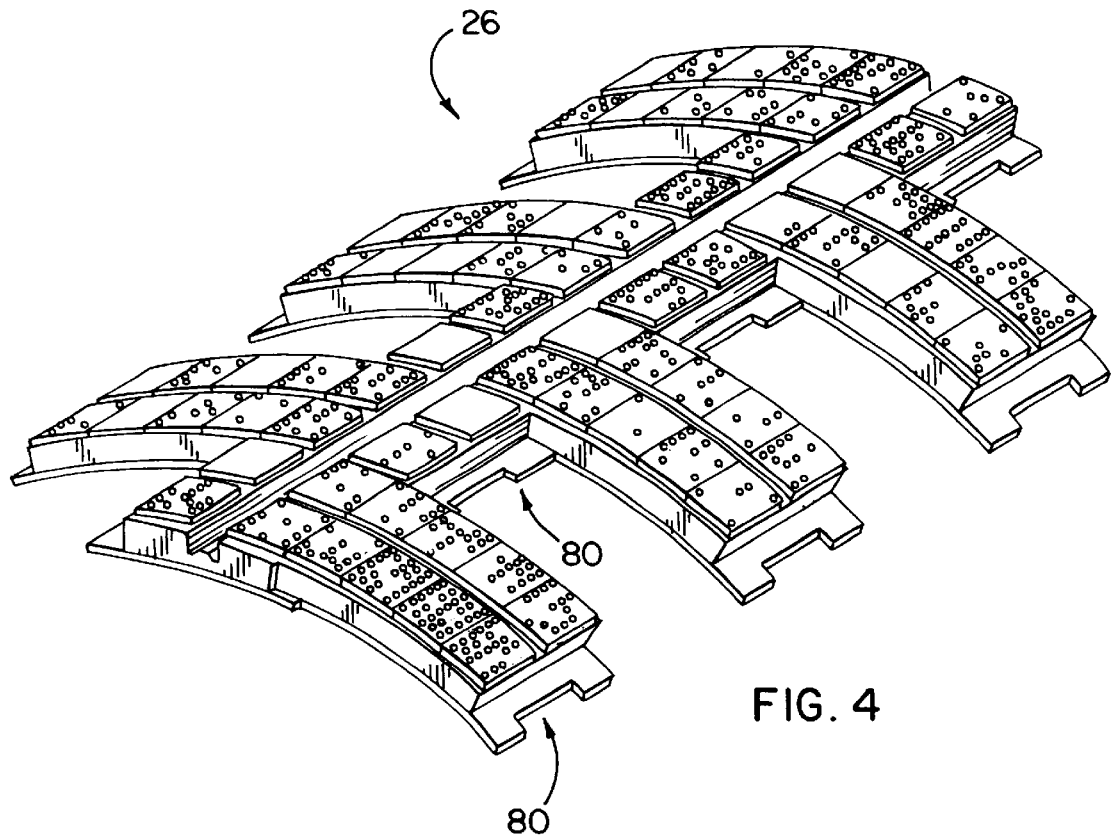
FIG. 4 is a perspective view of the lagging strip of FIG. 3 showing a plurality of ceramic tiles embedded in the rubber carrying material.

What has been found is that even at the upper range of surface area coverage, the configuration of the lagging members, and in particular that of the backing plate 32 and lagging material 28 having the crenellated outer peripheral configuration, provides an optimized distribution of force transmission interfaces between the lagging material 28 and the conveyor belt. As can be seen in FIGS. 1 and 2, this optimum distribution is akin to a checkerboard pattern of lagging material 28 on the pulley face 12 which isolates those small regions 46 that lack lagging material from one another. In this manner, the present system 10 avoids concentration of lagging free areas on the pulley drive surface 12, and in particular separates these areas so that they do not cooperate to extend linearly across substantially the entire width of the pulley face 12 in the lateral direction 18 and with a wide enough gap in the circumferential direction 19 to cause problems in conveyor belt operations, as previously described.

To determine the lower and upper ranges, the surface area of the drive surface 12 is first calculated by determining the circumference thereof, which is the pulley diameter multiplied by pi. For this purpose, the thirty-six inch diameter of the pulley 14 is adjusted to take into account the thickness of the lagging strip 26 from the bottom surface of the backing plate 32 to the upper surface of the ceramic tiles 20, which can be approximately 0.505 inch, not taking into account the small height of the nibs 22. Accordingly thirty-six inches plus 0.505 times two multiplied by pi gives a circumference for the drive surface 12 having lagging strips 26 attached thereon of 116.27 inches. Thus, to determine the total surface area for the drive surface with the lagging installed, the circumference is multiplied by the thirty-six inch width of the drive surface 12 to yield a surface area of 4,185.73 inches$^2$.

The tiles can be approximately 20 millimeters by 20 millimeters so that they have a surface area of approximately 0.62 inches$^2$. Accordingly, assuming full coverage of the ceramic tiles 20 on the drive surface 12, one would divide the surface area of 4,185.73 inches$^2$ by the tile surface area of 0.62 inches$^2$ to yield 6,752 tiles.

The strips 26 are provided with a predetermined effective width based on the circumference of the pulley surface 12, as will be more fully described hereinafter. For a 36 inch diameter pulley, eighteen strips 26 are needed where there is to be full engagement or mating of the projecting portions 36 whereas if there is only to be tangent engagement, fourteen strips 26 are necessary. In one form, each lagging strip 26 has 216 ceramic tiles 20 with a combined surface area of 133.92 inches$^2$, so that eighteen such strips 26 will have 3,888 tiles covering a surface area of 2,411 inches$^2$, whereas fourteen strips 26 will have 3,024 tiles covering a surface area of 1,875 inches$^2$. With eighteen strips 26 in full engagement about the pulley surface 12, the surface area of the tiles, i.e. 2,411 inches$^2$, divided by the surface area of the pulley, taking into consideration the lagging thickness, i.e. 4,185 inches$^2$, yields an upper range of surface area coverage for the ceramic lagging material 28 of the present system 10 of 57.5 percent. Doing a similar calculation for the lower range of the coverage where fourteen strips 26 are attached on the pulley drive surface 12 yields a 44.7 percent figure for the surface area coverage of the ceramic lagging material 28.

As can be seen, even at the higher level of tile coverage, there is a significant drop off from full coverage and thus a significant savings in terms of the cost of ceramic tiles 20 when utilizing the present lagging system. Moreover, it has been found even at the lower range of tile coverage set forth above, the present lagging system 10 still provides good load carrying characteristics due to the optimized distribution of the force-transmitting interfaces via the checkerboard pattern provided to groupings of tiles about the pulley drive surface 12, as previously described. It is believed that the present lagging system 10 will keep the drive force differential between the incoming point at which the belt first engages the lagging material 28 on the pulley drive surface 12 to the outgoing point at which the conveyor disengages from the ceramic lagging material 28 for its return run at an acceptable level so as not to cause problems relating to belt contraction, slippage or the like due to the optimized distribution of the lagging material 28 on the pulley drive surface 12.

Figure 16:
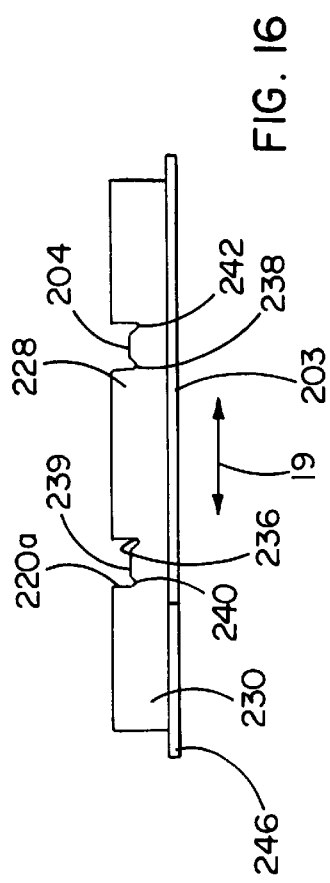
FIG. 16 is a side elevational view of the lagging strips showing a carrying member in the form of a metal backing plate which carries the lagging material thereon.

Turning next to more of the details of the lagging system 200, the strips 216 are made in substantially the same manner as the prior Flex-Lag® product previously discussed to reduce costs in the production thereof. To this end, the ceramic tiles 20 are molded into the elastomeric rubber backing 224 so that the upper, flat surface of the tiles 20 is substantially flush with the top surface of the rubber material 224, as can be seen in FIG. 16. The nibs 22 on the tiles 20 project slightly thereover for engaging and gripping in the underside of the conveyor belt, such as in the lower cover thereof. The tiles 20 which can have a square plan shape have a thickness with sides 220a that at their lower portions are substantially surrounded and captured by the rubber material 224 in which they are molded in place and embedded.

Figure 14:
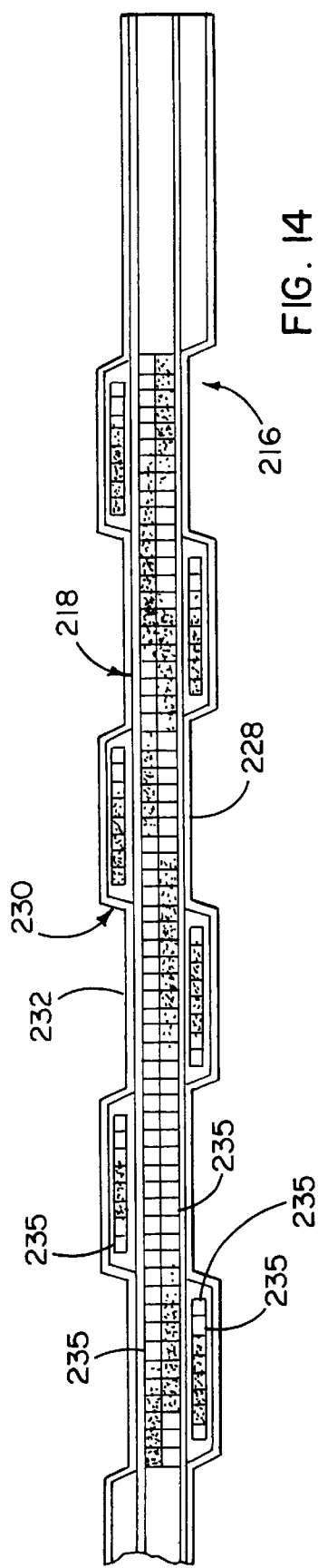
FIG. 14 is a plan view of one of the lagging strips showing lagging material in the form of ceramic tiles on the strip including the projecting portions thereof.

As previously mentioned, the rubber material 224 including the ceramic tiles 20 embedded therein are bonded to a metal backing plate 226 which is welded to the pulley face 12. In the prior Flex-Lag® product, the portion corresponding to the main elongate portion 228 of the present strip 216 included two rows of ceramic tiles 20 that extend continuously in the lateral direction 18 thereacross. As best seen in FIG. 14, the present strips 216 are similarly configured with two rows of ceramic tiles 20 extending continuously along the main elongate portion 228 thereof in the lateral direction 18. In the prior Flex-Lag® product, areas of reduced thickness rubber material or so-called cutting sipes extend along either side of the rows of ceramic tiles 20. Cutting sipes 236 and 238 are also present along side the rows of ceramic tiles 20 on the elongate portion 228 of the strips 216 herein, although it is noted that these sipes are not necessary for fitment purposes given the fitment advantages afforded by the projecting portions 230 as previously discussed. Further cutting sipes 240 and 242 are provided spaced outwardly from adjacent sipes 236 and 238 in the direction 219 with reduced height land areas 239 and 241 between the respective adjacent pairs of sipes, although being slightly higher than the sipes on either side thereof. These sipes 240 and 242 also are not needed with the present lagging strips 216 in terms of being locations for cutting as the strips 216 no longer need to be cut for obtaining proper fitment on the pulley face 212 due to the provision of the projecting portions 230. The outer sipes 240 and 242 are remnants of the sipes that were adjacent additional pairs of rows of ceramic tiles 20 in the Flex-Lag® product so that strips could be cut therefrom for circumferential fitment. Nevertheless, the land areas 239 and 241 together with the cutting sipes 236, 238, 240 and 242 define channels which are advantageous for fluid drainage purposes laterally outward from the conveyor system. In the present strip 216, it is from these outer cutting sipes 240 and 242 that the projecting portions 230 extend in the direction 19 and instead of being bracketed by sipes such as the interior pair of adjacent rows of tiles 20 on the elongate portion 228, the tiles 20 on the projecting portions 224 are spaced from the respective sipes 240 and 242.

Continuing reference to FIG. 16, the illustrated form of the lagging strips 216 is shown as having a width in the direction 219 including projecting portions 230 on either side of the main portion 228 of approximately 5 9/16 inches and a total height of approximately 9/16 inch. Of this height, the metal backing plate can be approximately 1/16 inch in thickness while the height of the rubber carrying material 224 and including the ceramic tiles 20 embedded therein can be approximately 1/2 inch. The width of the main elongate portion 28 including the pair of rows of ceramic tiles 20 carried thereby can be approximately 1 9/16 inches and the width of the projecting portions 230 can be approximately 1 5/16 inches. The distance across the land areas 239 and 204 between adjacent sipes 236 and 240, and 238 and 242, can be approximately 7/16 inches. It should be understood that the above sizes are exemplary for a lagging strip that can be used in a particular rating of application so that these sizes will vary depending on, for instance, whether the application is light or heavy duty based on the rated belt tension. This range can vary for example from between 100 lb/in of belt width (P.I.W.) or less such as in light-duty applications up to 2000 lb/in or more of belt width in underground mining applications.

As shown in FIG. 15, side wall portions 243 and 245 of the projecting portions 230 can extend obliquely from the laterally extending sipes 240 and 242 so that the walls 243 and 245 taper slightly toward each other and are interconnected by outer wall portion 244. The side wall portions 243 and 245 can extend perpendicular to the sipes 240 and 242, if desired. Accordingly, the spaces 232 between the projections 230 are bounded by the walls 243 and 245 of adjacent projecting portions 230 on a strip 216 which walls 243 and 245 taper away from each other as they extend outward from the main portion 228 of the strip 216. In this manner, the projecting portions 230 can be mated in the spaces 232 at varying degrees of mesh or interfit therebetween based on the position of the outer wall portion 244 of the projecting portions 230 in the circumferential direction 219 in the space 232 into which it is mated.

A limitation on the degree of mesh between the interposed projecting portion 230 is the metal backing plate 226 and in particular outboard portion 246 thereof that projects out from under the rubber material 224 of the lagging strip 216. As can be seen in FIGS. 14 and 15, this outboard portion 246 projects by approximately ¼ inch out from under the elastomeric material 224 of the lagging strip 216. Further, similar to the prior Flex-Lag® product, the backing plate outboard portion 246 has a long, laterally extending configuration on either side of the main elongate portion 228 corresponding to the base of the spaces 232 defined between projecting portions 230 and follows the configuration of the wall portions 243–245 around the projecting portions 230. In FIG. 14, it is shown that the distance between the outermost outboard portion 246a projecting out from under outer wall portion 244 of the projecting portion 230 of one lagging strip 216 and the innermost outboard portion 246b projecting out from under the strip main elongate portion 228 of an adjacent lagging strip 216 is approximately 7/16 inch to provide sufficient surface area on the pulley face 212 therebetween for welding the outboard portions 246a and 246b thereto.

Figure 5:
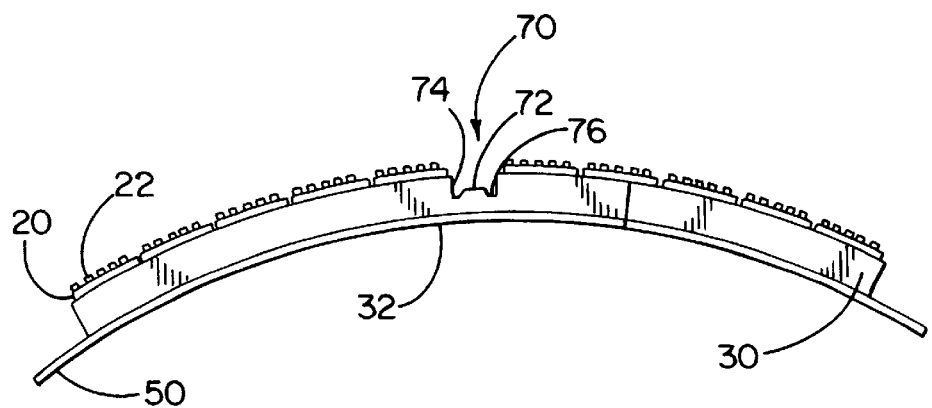
FIG. 5 is an elevational view of the lagging strip of FIG. 4 showing leading and trailing edges defined by the ceramic tiles and the carrying material therefor substantially aligned with each other.

The lagging strips 26 of the lagging system 10 in FIGS. 1–10 will next be more further described. In terms of their manufacture, the strips 16 are molded so that the ceramic tiles 20 are embedded in the rubber carrying material 30, which is attached to the backing plate 32 as in the system 200. The backing plate 32 can be provided either in a pre-curved form as shown in FIG. 5 or in a flat form as shown in FIG. 10, and as will be described more fully herein. As can be seen in these figures, upper portions of the tiles 20 project slightly above the rubber carrying material 30 with the nibs 22 further projecting upwardly therefrom for engaging the underside of the conveyor belt.

One significant difference from the lagging strips 216 is that the projecting portions 36 have a much greater number of tiles 20 thereon than the corresponding projecting portions 230.

The lagging strips 26 have a longitudinal axis 54 extending centrally through the main elongate portion 34 thereof. The lagging strips 26 include substantially rectangular shaped sections 56 that are connected to each other and are alternating in terms of their offset from axis 54. In other words, one section 56 is offset to one side of the axis 54 so that a greater portion thereof projects on this side than to the other side of the axis 54, while the next adjacent sections 56 is offset to the other side of the axis 54 so that a greater portion of this section is on the other side of the axis than on the one side of the axis. As can be seen, this creates projecting portions 36 and fitment spaces 38 on one side of the axis 54 that are offset along the axis from projecting portions 36 and fitment spaces 38 therebetween on the other side of the axis and produces a staggering of the projecting portions 36 on either side of the strip 26 so that the portions 36 of adjacent strips will be aligned with fitment spaces 38 for being mated therein.

Referencing FIG. 9 and as mentioned, one significant difference over the lagging strips 216 is in the greater number of tiles 20 provided on the projecting portions 36. This is because the projecting portions 36 of the rectangular sections 56 are larger than the projection portions 230 of strips 216. In this manner, the strips 26 allow for a greater degree of meshing or mating of the projecting portions 36 and thus overlapping of ceramic tiles 20 in the circumferential direction 19 on adjacent strips 26. As shown, each rectangular section 56 has six adjacent rows of tiles 20 extending in the axial direction and four columns of tiles 20 so that the rectangular section 56 carry twenty-four ceramic tiles 20 each. As can be seen in FIG. 2, with the strips 26 attached to the pulley surface 12 in substantial full mating relation, there are two rows of tiles 20 on the projecting portions 36 that overlap in the circumferential direction 19.

Continuing reference to FIG. 9, it will be noted that in the rectangular sections 56 at either lateral end 58 and 60 of the strips 26, only three columns of tiles 20 are utilized with the endmost tile column left off. This provides efficiency in ceramic tile usage as conveyor belts typically do not extend across the full width of the pulley drive surface 12. Thus, as can be seen in FIGS. 1 and 2, the strips 26 can be attached to the pulley 14 to extend across the full width of the drive surface 12 so that the strip ends 58 and 60 are aligned with the pulley ends 16 and 17 with thin circumferential areas 62 and 64 of exposed rubber material 30 defined around the pulley face 12 at the strip ends 58 and 60 with spaces between each strip 26. The width of the conveyor belt will extend between these two circumferential areas 62 and 64 and be engaged by the checkerboard pattern of ceramic tiles 20 provided on the pulley drive surface 12 via the lagging system 10 herein. It should be noted that these areas 62 and 64 can be used as a lagging friction surface of engagement with the belt such as during belt operations where the belt can often migrate back and forth in the lateral direction 18.

In the strips 26 and backing plate 32 therefor shown in FIGS. 8 and 9, the rectangular sections 58 including the endmost sections are of the same size. The strips 26 including the associated backing plate 32 of FIGS. 6 and 7 have end sections 58 that are reduced in size relative to the intermediate sections 58. These strips 26, however, are provided with a greater number of such intermediate sections 58 so that their axial length is greater than the strips of FIG. 9. As shown in FIG. 7, the endmost sections include two columns of ceramic tiles and lack tiles proximate the strip ends 58 and 60 so that when installed, they will cooperate to define the thin circumferential end areas 62 and 64 of exposed rubber material 30, as has been described. The differences between lengths of strips in FIG. 7 and FIG. 9, and in particular the size of the endmost sections 58 in the lateral direction, is to accommodate the industry accepted pulley face widths.

As previously mentioned, the strips 26 are provided with an effective width perpendicular to their axis 54 that is preferably sized so that one can determine the number of strips 26 that are to be used for a particular diameter of pulley 14 on which they are to be installed. The effective width of the strips 26 is measured between the outermost periphery of one its rectangular sections 56. In other words, outer edges 66 and 68 of the outboard portions 50, which will be leading and trailing edges of the outboard portions depending on the orientation in which the strip 26 is attached to the pulley surface 12, will be the points from which the effective width of the strips 26 is measured.

The strips 26 are provided with a predetermined effective width that is generally based on even multiples of pi so that their number can be readily determined for a known diameter pulley. To determine how many strips 26 are needed, the circumference of the pulley drive surface 12 is divided by the width of the strips 26, which extends in the circumferential direction 19 as previously discussed. Most pulley diameters are of an even number, hence the even number multiple of pi is chosen for the effective width of the strips 26 so that there is a whole number of strips 26 determined based on the pulley circumference and diameter.

For example, the effective minimum width of a strip 26 in this scenario can be two times pi. However, to provide some play in the fitment process, this two time pi width is provided as a width of 6.2030 inch between the outboard edges 66 and 68. Taking the pulley circumference of pi times the pulley diameter and dividing that by the effective width of two times pi provides a calculation of the pulley diameter divided by two for determining the number of strips to be used on an even diameter pulley 14 where the strips have an effective width of two times pi. Accordingly, all an installer has to do to determine the number of such strips to utilize is to halve the diameter of the pulley 14. This would provide the installer with the number of strips 26 to use determine the number of such strips to utilize is to halve the diameter of the pulley 14. This would provide the installer with the number of strips 26 to use if the strips are to be attached to the pulley surface 12 with the projecting portions 36 thereof in substantial full mating engagement in the fitment spaces 38. Thus, a thirty-six inch diameter pulley would need eighteen of the two times pi wide strips 26.

For molding of the strips 26, an alignment rail is provided in the mold for holding the ceramic tiles 20 in place relative to the rubber carrying material 30. This rail extends along the central axis 54 of the strips 26. Upon molding, the rail creates a recessed area 70 extending along the longitudinal axis 54 in the main elongate portion 34 the strips 26. With the strips 26 attached to the pulley surface 12, the recessed areas 70 will extend linearly across the width of the pulley 14 and are useful as drainage channels so that any fluid that migrates into the area between the lagging and the underside of the conveyor belt can be directed out from this interface via the channel 70. It should be noted that these recessed areas or channels 70 while devoid of lagging material and extending linearly for the entire width of the pulley 14 are not of a sufficient circumferential width to generate the concerns relating to conveyor belt operations as has been discussed herein. The recessed areas 70 include a land surface 72 and longitudinally extending grooves 74 and 76 on either side thereof. In the prior Flex-Lag® system, these grooves 74 and 76 serve as cutting areas as the thickness of the rubber material 30 is reduced thereat and are termed cutting sipes, as mentioned. These cutting sipes were needed to adjust the circumferential width of the prior strips to allow for proper fitment about the pulley drive surface 12. As is apparent, with the present strips 26, such cutting sipes 74 and 76 are unnecessary, and can be omitted if desired.

The strips 26 are preferably provided with transverse areas 78 that extend between columns of the ceramic tiles 20 perpendicular to the strip axis 54 to allow the axial length of the strips 26 to be adjusted so that they can be tailored for use on pulleys 14 having different widths in the lateral direction 18. In this manner, an installer need not cut through any of the hard tiles 20 to reduce the length of the strips 26, and instead can just cut through the rubber carrying material 24 and the backing plate 26 thereunder for tailoring the size of a strip 26 to the pulley width. As can be seen in FIG. 9, these transverse cutting areas 78 occur generally at the midpoint along the length of each rectangular section 58 so that with intermediate rectangular sections 58, the areas 78 have two columns of tiles 20 on either side thereof. In addition, the areas 78 occur between the rectangular sections and are shorter than the central cutting areas 78 on the sections 58. These can be used when the number of rectangular section 58 is to be changed.

The backing plate 32 is of a rigid material. In the preferred form, the backing plate is of a metallic material such as a 14 gauge steel material. The metal backing plate 32 can be secured to the pulley face 12 by fasteners, although the usual and preferred mode of attachment is by welding.

Figure 29:
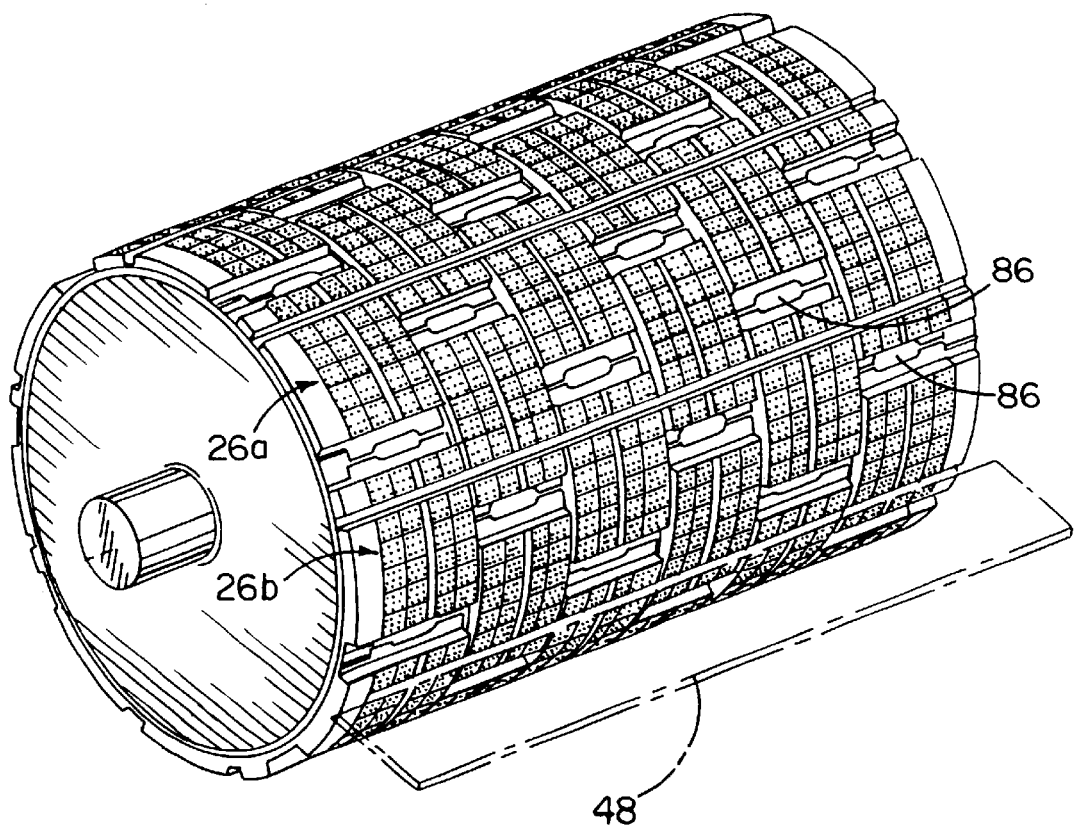

As previously mentioned, the outboard portions 50 include specialized attachment structure 80 which preferably provides an easily identifiable attachment area 82 for the strips 26 to the pulley face 12, as can be seen in FIG. 2. More particularly, the outer or leading and trailing outboard portion edges 66 and 68 include recesses 84 formed therein, as can be seen in FIGS. 6 and 8. On both edges 66 and 68 their recesses 84 are formed so as to be consistently spaced therealong. Accordingly, the recesses 84 on one edge 68 are aligned from the recesses formed along the opposite edge 66 or 68 and are not axially offset therefrom. In this manner, when the strips 26 are attached to the pulley face 12, recesses 84 will be aligned with each other. With the outboard portions 50 of adjacent strips 26 closely spaced from or engaged with each other, the aligned outboard portion recesses 84 on adjacent strips 26 cooperate to form an attachment slot 86 therebetween leaving a predetermined amount of the drive surface 12 of the pulley 14 exposed for welding thereto, as can be seen in FIG. 29. This slot 86 provides sufficient area on the pulley surface 12 so that some imprecision in welding therein is allowed while still maintaining sufficient spacing from the rubber material 30 so that the heat generated during welding will not create softening of the rubber.

It is preferred that the recesses 84 include a linear weld edge 88 which is recessed back from the outboard portion edges 66 and 68 toward the rubber material 30 attached to the backing plate 32. So, for example, in the strip 26 shown in FIG. 9, the distance between the outer edges 66 and 68 of the backing plate outboard portions 50 to the rubber material 30 can be approximately 0.5279 inch with the linear weld edge 88 being recessed back approximately one third of this distance to provide the necessary spacing for welding along the edge 88 without degrading the rubber material 30.

In this regard, the linear nature of the weld edge 88 is particularly advantageous. Because each of the edges 88 extend in the same linear direction, a welder does not have to significantly readjust their tools such as their torch and welding material in terms of the angle of attack toward the weld edge 88 each time a new weld attachment is to be created along each weld edge 88 in each one of the recesses 84. Because of this, a welder does not have to continually readjust their stance or position relative to the pulley such as would be the case if the weld edges of a particular strip 26 were at varying orientations relative to the linear direction 18.

Another advantage over prior lagging systems is that the linear weld edge 80 is of a predetermined length, such as on the order of approximately 1⅞ inches. In contrast to prior systems that left an installer to guess at how long a weld attachment should be created, the installer will know that if they create a weld attachment along the entire length of the edges 88 of a strip 26, the strip 26 will be securely attached to the pulley face 12. In other words, the length of the weld edge 88 is sized to correspond with the maximum length of the weld attachment needed therealong to ensure a secure strip attachment to the pulley As shown, the recesses 84 are disposed intermediate end sections 90 and 92 of the outboard portion 50 for a particular strip section 58. The end sections 90, 92 can define engaging portions of the strips 26 when attached to the pulley face 12. When the end sections 90, 92 are abutted to corresponding sections 90 and 92 of an adjacent strip 26, the strips 26 are in full mating relation in terms of the projecting portions 36 and fitment spaces 38. As can be seen in FIG. 6, the longer backing plate 32 only includes the innermost one of the end sections 90 and 92 at the endmost rectangular sections 58 due to the smaller size thereof, as best seen in FIG. 7. In an alternative form, lagging members 93 are provided which include projecting portions 94 having ceramic tiles 20 thereon, depicted schematically in FIG. 25, with the portions 94 being aligned across from each other in the axial direction on opposite sides of the axis of the members unlike the axially offset projecting portions 36 of the strips 26. In this instance, the outboard portions 50 simply follow the general contour of the outer periphery of the alternative lagging members 93. In addition, no part of the backing plate projects beyond the outermost periphery of the projecting portions 94 to generally allow the lagging material including the rubber carrying material 30 and tiles 20 to be abutted at their leading/trailing edge at the outboard portions 94 with the outboard portion end sections 90 and 92 abutting corresponding outboard sections 90 and 92 on adjacent strips. In this fashion, the weld slots 86 will be only defined between the projecting portions 94, as shown.

Referring to FIGS. 3, 6 and 8, it can be seen that the backing plate 32 in its precurved form (FIG. 3) and its flat form (FIGS. 6 and 8) is provided with openings or apertures 96 therein to improve the flexibility of the plate 32, which is particularly important in the flat form thereof, and to allow the rubber material 30 to project into the openings to provide an interlock between the material 30 and the plate 32. The mechanical interlock provides additional resistance to shear forces that the strips 26 experience during conveyor belt operations over that provided by the bond between the material 30 and the top surface of the shear forces that the strips 26 experience during conveyor belt operations over that provided by the bond between the material 30 and the top surface of the plate 32. These openings 96 are described further hereinafter with respect to alternative forms of backing plates 253, 270 and 294.

Figure 11:
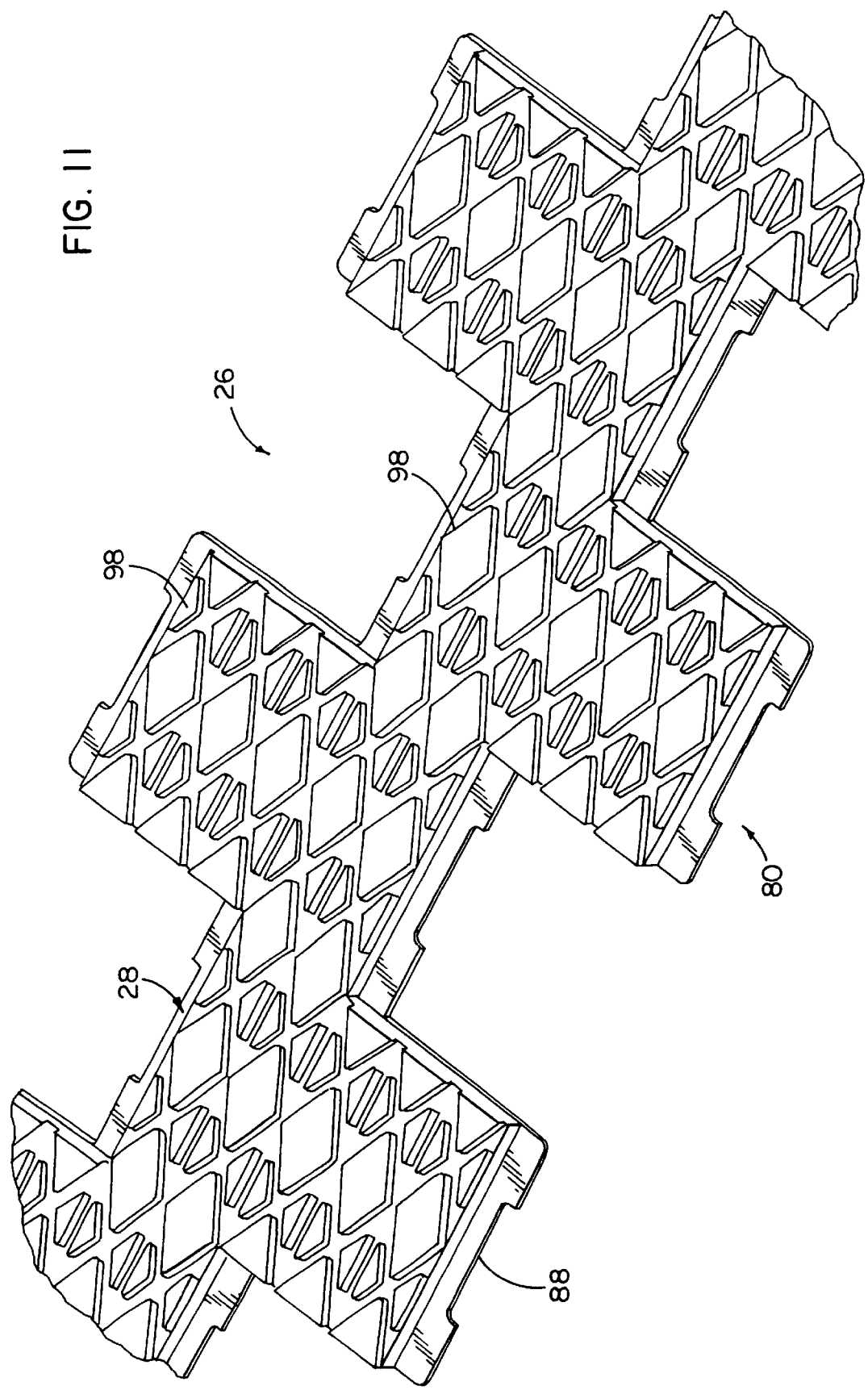
FIG. 11 is a perspective view of an alternative lagging strip in accordance with the present invention similar to that shown in FIG. 7 except having a rubber lagging material with a diamond pattern provided thereto.
Figure 12:
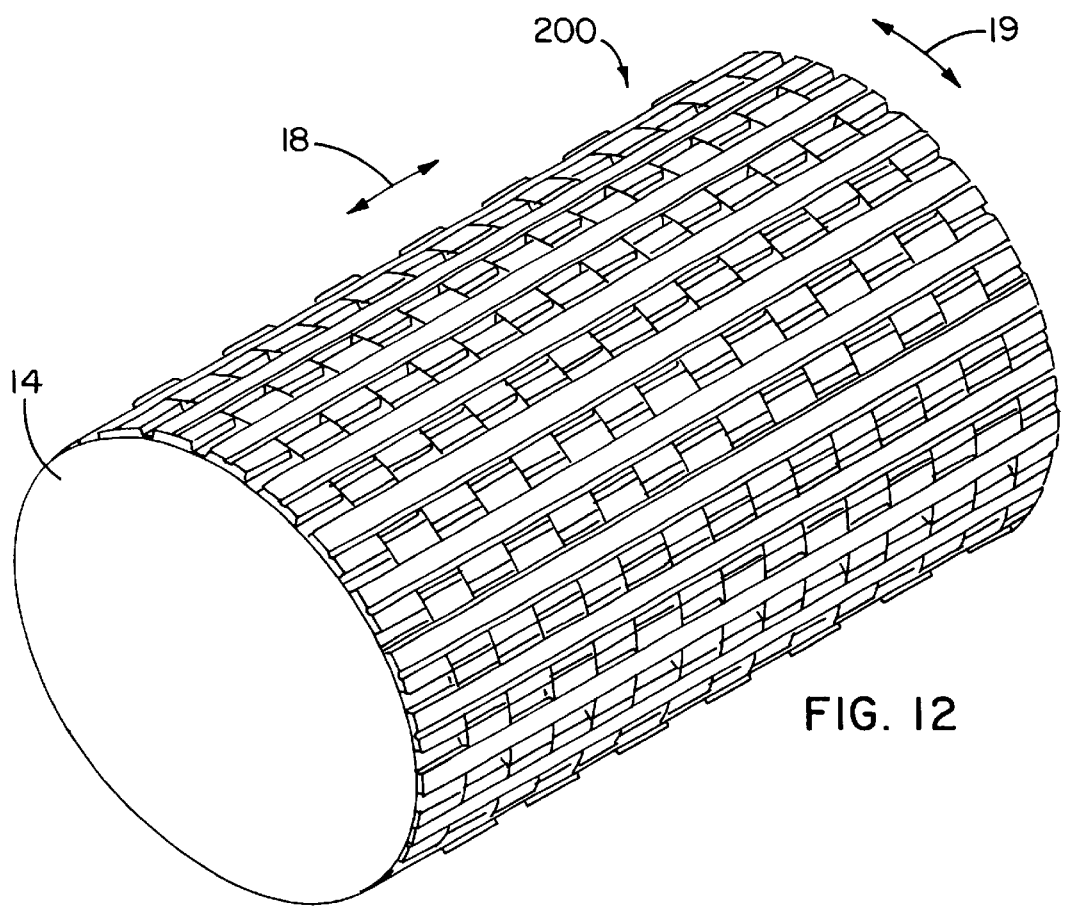
FIG. 12 is a perspective view of another lagging system in accordance with the present invention similar to that shown in FIG. 1 showing a conveyor belt pulley having lagging strips attached to the face of the pulley each of the strips including projecting portions interfitting in fitment recesses formed between projecting portions of an adjacent strip.
Figure 13:
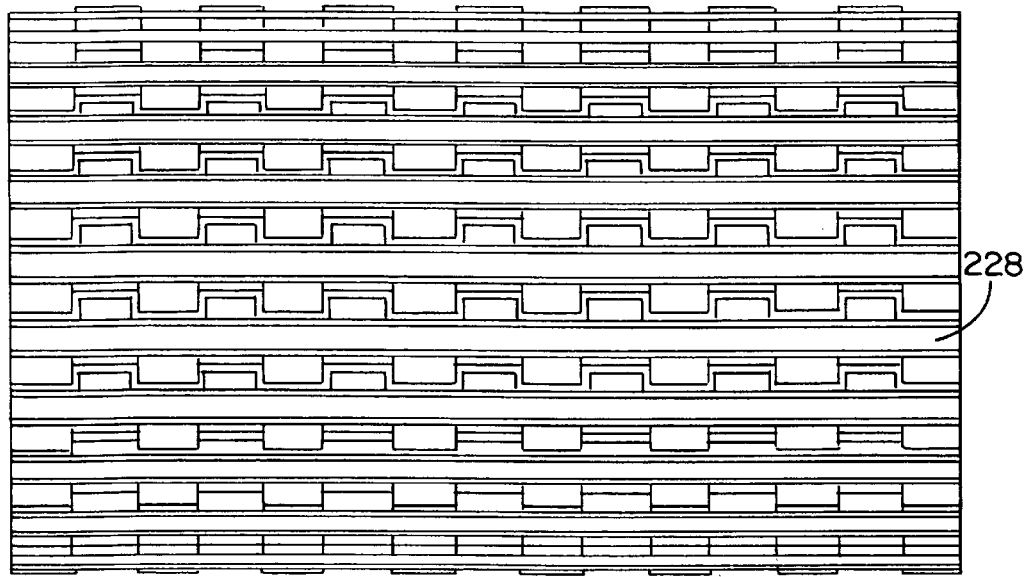
FIG. 13 is an elevational view of the lagging system of FIG. 12 showing the projecting portions on the lagging strips interposed between projecting portions of the lagging strips adjacent thereto.

As has been mentioned, the strips 26 can have different types of lagging material 28 in addition to the previously described ceramic tiles 20. For example, the lagging strips 26 as shown in FIG. 11 include a rubber lagging material 28 integral with the carrying material 30. As shown, the lagging material 28 can include raised triangular or diamond-shaped lagging nodules 98 for engaging the underside of conveyor belts. Similar to the tiles 20, the nodules 98 extend to the outermost periphery of the rubber carrying material 30, and cooperate therewith to define the leading/trailing edge 40, and in particular, the non-linear, and in this instance, crenellated configuration, previously discussed.

FIGS. 18A–18C depict lagging strips 252 and are improved in certain respects over the previously-described lagging strips 216 of FIGS. 12–16. In particular, the strips 252 also include projecting portions 254 projecting in the circumferential direction 19 relative to lateral axis 256 of the strips 252. Unlike the strips 216, the strips 252 are configured significantly different from the prior Flex-Lag® product and thus do not need to include the unneeded cutting sipes 236, 238, 240 and 242 for fitment purposes of the previously-described strips 216. To this end, a greater amount of lagging material 218 can be used thereon.

As shown, the lagging strips 252 are formed from connected rectangular-shaped sections 258 alternating in terms of their offset from axis 256. Accordingly, similar to strip sections 56 of strip 26, the first section 258 is offset to one side of the axis 256 while the next adjacent section 258 is offset to the other side of the axis 256 so as to create the projecting portions 254 and corresponding spaces 260 between adjacent sections 258 and the projecting portions 254 thereof. In both strips 216 and 252, the spaces 232 and 260 are defined between pairs of laterally spaced projecting portions 230 and 254, respectively, with this lateral spacing sized to provide a minimum of clearance between the projecting portions 230 and 254 when interfit therein. The small lateral clearance reduces the possibility that the strips 216 and 252 will become misaligned as by being shifted significantly in the lateral direction during the fitment process. As will be appreciated, since several strips are being applied to a pulley, lateral misalignments can become compounded and rise to level of being a significant problem downstream during installation, such as where several strips are shifted laterally from the desired centered installation position with respect to adjacent strips.

As best seen in FIG. 18B, the rectangular sections 258 allow for a larger field of ceramic tiles 20 to be embedded in the elastomeric material 224 thereon. To this end, in the illustrated strips 252, the tile coverage is approximately 60 percent which is within the range of the optimal reduced coverage level for the tiles 20 while being above the threshold low coverage level. As shown, each rectangular section 258 has six adjacent rows extending in the lateral direction 18 and four columns extending in the circumferential direction 19 so that the rectangular sections 258 carry twenty-four ceramic tiles 20 each. Thus, one advantage of the lagging strips 252 is that when projecting portions 254 are mated in spaces 260 of adjacent strips 252, there will be a large degree of overlap in the circumferential direction 19 of the respective ceramic tiles 20 thereon. As can be seen in FIG. 18C, it is possible to obtain two rows of tiles 20 that overlap in the circumferential direction 19 so that when looking across the pulley face 12 at any point around the circumference of the pulley 14 there is substantially uninterrupted lateral coverage of tiles 20 in the lateral direction 234 across the pulley face 12, and thus no guttering effects.

To further enhance the ability of the tiles 20 on adjacent strips 216 and in particular on the projecting portions 254 thereof to overlap in the circumferential direction 19, the lagging strips 252 can employ welding tabs 262 that extend from the backing plate 253 (FIG. 22) and out from under the they do not extend across the entire lateral extent of the periphery of the lagging strips 262 similar to the outboard portion 246 vis-a-vis lagging strips 216. In this regard, FIG. 21 shows a backing plate 270 lacking tabs 262 where the backing plate 270 has a greater size in the direction 19 for each of rectangular sections 258 than the corresponding portion of the sections 258 of the plate 253 in the tabbed strips 252. As can be seen in FIGS. 18B and 18C, the welding tabs 262 of adjacent lagging strips 252 can be interfit so that they overlap in the circumferential direction 19 in a manner similar to the projecting portions 254, while leaving significant space in the lateral direction 18 therebetween to provide sufficient surface area on the pulley face 12 for spot or fillet or other type of welding of the tabs 262 thereto.

More particularly, a single welding tab 262a can extend centrally from the projecting portions 254 while on the other end of the rectangular sections 258, a pair of welding tabs 262b can be provided at either side thereof. Thus, when adjacent lagging strips 252 are interfit so that projecting portions 254 are interposed in spaces 260, the centrally positioned welding tabs 262a will be intermediate the side tabs 262b with spaces 264 on the pulley face 12 formed therebetween. As best seen in FIG. 18C, the tabs 262 have a square shape and are preferably sized so that the spaces 264 are of the same lateral width as the tabs 262 to provide the necessary surface area on both the tabs 262 and pulley face 12 to provide a sufficiently strong and durable weld attachment therebetween.

In FIG. 19, a lagging strip 252' is shown that only differs from the strip 252 of FIGS. 18A–18C in the shape of its welding tabs 262' which have a triangular configuration in contrast to the square tabs 262. As shown, the single central tab 262a' can take the form of an isosceles triangle having inclined equal length sides 280 and 282 meeting at apex 284 spaced outward from the projecting portions 254'. The side tabs 262b' can be in the form of a right triangle including hypotenuse side 286. In this manner, when adjacent lagging strips 252' are interfit, the tabs 262a' will be mated in the area between the side tabs 262b' with hypotenuse side 286. In this manner, when adjacent lagging strips 252' are interfit, the tabs 262a' will be mated in the area between the side tabs 262b' with the inclination of respective sides 280, 282 and 286 providing an extended length for the tabs 262a', 262b' along which welding can take place. The triangular tabs 262' have been found to be less preferred than the attachment structure 80 in terms of ease of installation as the obliquely extending edges thereof require a welder to reposition their equipment for welding of each edge of a tab 262' in contrast to the straight edges 88 for each section 56 of the strips 26.

Another advantage of forming the lagging strips 262 in rectangular sections 258 is that there are areas 266 between the rectangular sections 158 and in particular the field of ceramic tiles 20 thereon that extend in the circumferential direction 19 devoid of the tiles 20. The areas 266 only include the rubber material 224 of the strips 252 and thus provide areas that can be cut to tailor the length of the strips 252 in the lateral direction 18 for adjustments to shorter width pulleys 14. Cutting the strips 252 to length allows lateral ends 267 of the cut strips 252 to be abutted against each other to provide proper fitment on a range of pulley widths. In this manner, the strips 252 do not have to be manufactured in standard lengths for different widths of pulleys 14, such as for pulleys that can vary from two to ten feet in their width. These cutting areas 266 are advantageous as they provide distinct lines 268 along which the strips 252 can be cut without encountering ceramic tiles 20 which are much more difficult to cut through than the rubber material 224 and metal backing plate 226.

Turning to FIGS. 17A–17C, the strip 216 including backing plate 226 having a curved form is shown fitted onto pulley faces 12 of different circumference pulleys 14a–14c. As shown, the curvature of the backing plate 226 is ideally suited for fitment onto the thirty-six inch diameter pulley 14b of FIG. 17B as the curved metal backing plate 226 conforms to the radius of curvature thereof in the circumferential direction 19 so that it sits flush against the face 12 when welded thereto. On the other hand, with the larger forty-eight inch circumference pulley 14a of FIG. 17A, having a smaller degree of curvature, the backing plate 226 curves away from the pulley face 12 so that spacing 248 tends to be created such as on the order of 5/64 inch between the plate 226 and the face 12 under the main elongate portion 228 of the strip 216. In contrast, with the smaller twenty-four inch diameter pulley of FIG. 17C, the backing plate 226 cannot fully conform to face 12 due to its larger degree of curvature so that spaces 250 such as on the order of 7/64 inch are left between the outboard portions 246 of the backing plate and the pulley face 12. Where spaces such as 248 and 250 are created, the curved plate 226 generally can be pushed down into conformity with the pulley surface 12 more readily than if the plate were flat for installation.

Figure 20A:
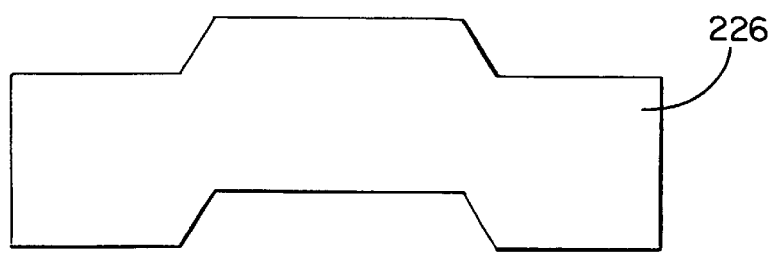
FIG. 20A is a plan view of a solid body backing plate for use with lagging strips having the projecting portions in accordance with the present invention.
Figure 20B:
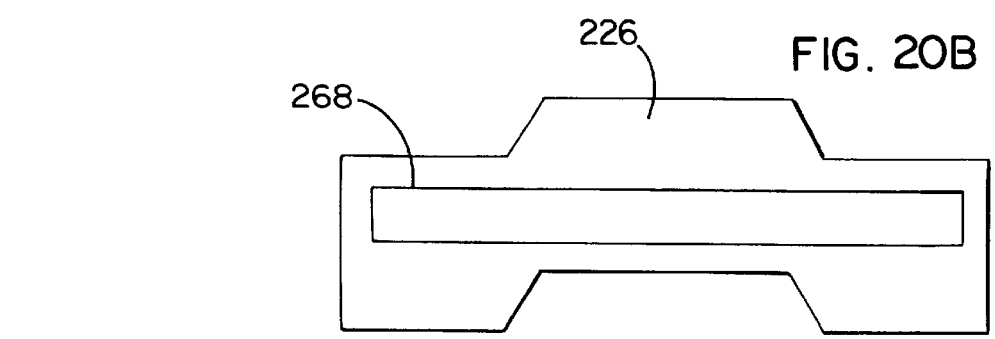
Figure 20C:
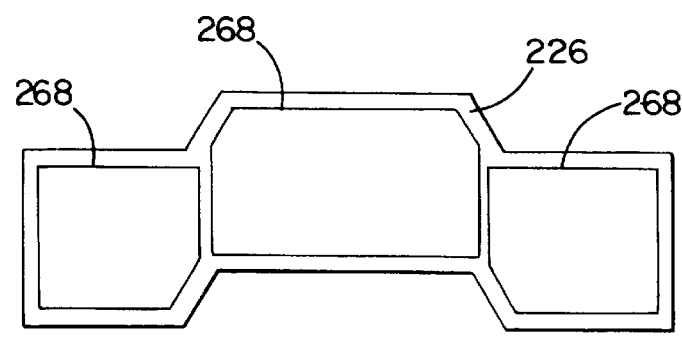

FIG. 20A shows a section of the backing plate 226 having a flat form for use with the lagging strips 216. As can be seen, it substantially conforms to the shape of the material bonded thereto, viz. elastomeric material 224 including the tiles 20 embedded therein and including the outboard portion 246 thereof. In this regard, the backing plate 270 for the elongate strips 252 also will have a shape conforming to that shown of its offset rectangular sections 258, as can be seen in FIG. 21. FIGS. 20B–20D illustrate alternative apertured backing plates that can be used with the strips 216, which apertured plate concept described hereinafter is also used with the backing plate 270 of the strips 252 as well as backing plate 32 of strips 26 earlier described.

Figure 23B:
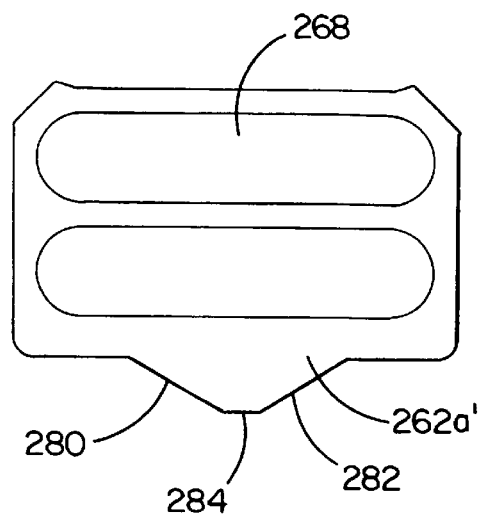
FIGS. 23A and 23B are plan views of the backing plate of the lagging strips of FIG. 19 including the generally triangular-shaped welding tab.
Figure 22:
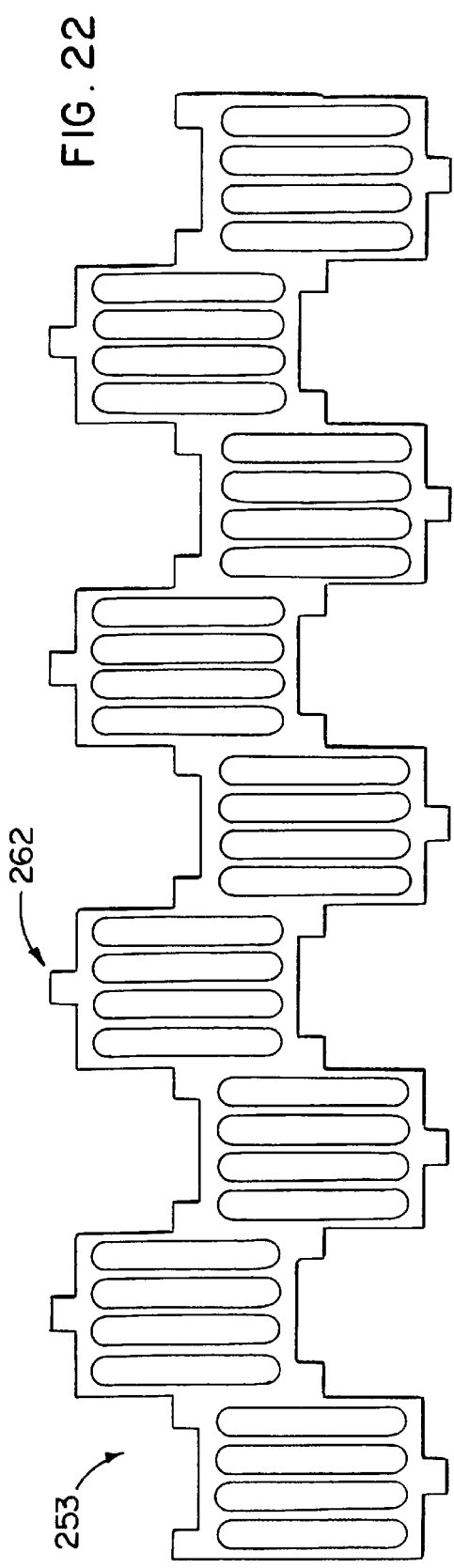
FIG. 22 is a plan view of the backing plate of the lagging strips of FIGS. 18A–18C including the welding tabs.
Figure 23A:
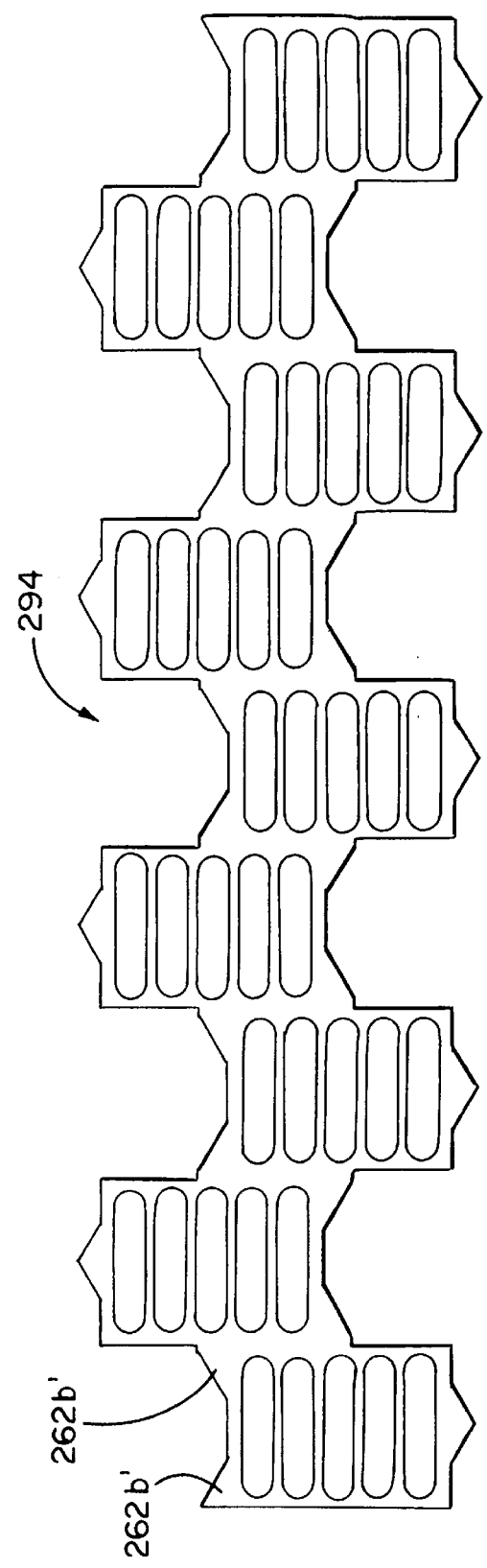

FIG. 20B shows an elongate rectangular shape opening 268 formed in the plate 226 extending in the lateral direction 18 under the main elongate portion 228 of the strip 216. FIG. 20C shows three openings 268 formed in the plate 226 each including portions on the main elongate portion 228 and extending into the projection portions 230. FIG. 20D shows a greater number of openings 268 and the backing plate 226 each having a rectangular shape and extending in the circumferential direction 19 spanning the main elongate portion 228 and projecting portions 230 of the strips 216. As mentioned, FIG. 21 is an apertured backing plate 270 having a flat form for the strips 252 where the welding tabs 262 or 262' are not utilized. As can be seen, the openings 268 extend in direction 19 and have rounded ends. Four elongate openings 268 underlie the material 224 on each section 258. FIG. 22 is a backing plate 253 for the strips 252 including the generally square-shaped weld tabs 262 with elongate openings 268 similar to those in backing plate 270. FIGS. 23A and 23B are to a backing plate 294 having a flat form for the strips 252' including the generally triangular-shaped tabs 262' with elongate openings 268 extending in the lateral direction 234. Five elongate openings 268 underlie the material 224 on each section 258 with two of these openings 268 being on the projecting portions 254 thereof. As is apparent, the exact shape and pattern of openings 268 can vary to obtain the benefits thereof which include providing the plates 226, 270 and 294 with greater flexibility so that it can conform to a wider range of different circumference pulleys such as the pulleys 14a–14c without creating the spaces 248 and 250 shown in FIGS. 17A–17C between the curved backing plate 226 and the large circumference pulley 14a and small circumference pulley 14c. Further, apertured backing plates 226, 270 and 294 can advantageously be utilized for crowned pulleys where the enhanced flexibility can improve the ability of the strips including the apertured plates to conform to the crowned face of the pulley. Correspondingly, the backing plates 226, 270 and 294 can also be increased in thickness over the non-apertured backing plate of FIG. 20A while obtaining the same degree of flexibility due to the provision of the openings 268 therein. The thicker backing plate material provides a greater volume of metal material for welding to the pulley face 12. In this manner, the outboard portion 246 need not be as large so as to allow the degree of mesh between the projecting portions 230 to be increased. The openings 268 also allow portions of the rubber material 224 to be filled therein during bonding of the material 224 to the plate 226 so that the rubber material 224 in the openings 268 creates a mechanical lock therebetween and resistance to applied shear loading between the conveyor belt and lagging strips 216. The openings 268 also can lighten the weight of the plates and thus the strips making them easier to handle during installation. It should be noted that in certain high loading or P.I.W applications, a more robust thick, curved backing plate may be desirable without the openings 268.

Alternatively, as opposed to welding the metal backing plate 226 to the pulley face 12, it can be adhesively applied such as by a pressure sensitive adhesive. The adhesive can be preapplied to the underside of the metal backing plate 226 and covered by a peel-off sheet until the strips 216 or 252 are ready to be installed on the pulley face 12. At that time, the sheet can be removed and the strips 216, 252 can be adhered to the pulley face 12.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What we claim is:

1. A lagging system for attachment to surfaces of pulleys of various diameters for transmitting drive forces of the pulleys rotating about a drive axis thereof to conveyor belts extending in a circumferential direction around the pulleys and in a lateral direction across the width of the pulleys between ends thereof substantially perpendicular to the circumferential direction, the lagging system comprising:

a plurality of elongate lagging strips each having a carrying member and lagging material supported thereon for being fit and attached about the pulley surface in driving engagement with a conveyor belt;

a predetermined length of each of the lagging strips that is generally sized to approximate the width of the pulley to which the strips are to be attached so that the strips are to be attached to the pulley with the strip length extending in the lateral direction;

a predetermined effective width of each of the lagging strips less than the predetermined length and extending in the circumferential direction with the strips attached to the pulley;

a first lagging strip of the plurality of elongate lagging strips;

an elongate leading edge of the lagging material of the first lagging strip generally extending lengthwise along the strip and having a predetermined configuration such that the leading edge is in non-coplanar relation with the pulley drive axis;

an elongate trailing edge of the lagging material of the first lagging strip generally extending lengthwise along the strip and having a predetermined configuration such that the trailing edge is in non-coplanar relation with the pulley drive axis;

a second lagging strip of the plurality of elongate lagging strips for being attached to the pulley surface adjacent the first lagging strip;

an elongate leading edge of the lagging material of the second lagging strip generally extending lengthwise along the strip and having a predetermined configuration such that the leading edge is in non-coplanar relation with the pulley drive axis and is generally matched to the predetermined configuration of the trailing edge of the first lagging strip;

an elongate trailing edge of the lagging material of the second lagging strip generally extending lengthwise along the strip and having a predetermined configuration such that the trailing edge is in non-coplanar relation with the pulley drive axis and is generally matched to the predetermined configuration of the leading edge of the first lagging strip; and the carrying members of the first and second lagging strips each including an outer periphery having a predetermined configuration that generally follows that of the respective lagging material leading and trailing edges to allow the adjacent strips to be attached close to each other on the pulley surface.

2. The lagging system of claim 1 wherein the predetermined configuration of the edges is one of a crenellated, oblique and stepped configuration.

3. The lagging system of claim 1 wherein the predetermined configuration of the lagging material edges provides an adjustable spacing between respective facing edges of the adjacent strips in the circumferential direction that is between: (1) a maximum circumferential overlap position of the strips lagging material with the facing edges abutting or closely spaced, and (2) a generally circumferentially aligned position of adjacent portions of the strips facing edges with the adjacent strips shifted circumferentially away from another so that the facing edges are spaced further from each other in the circumferential direction than in the maximum circumferential overlap position.

4. The lagging system of claim 3 wherein the adjustable spacing includes positions between the maximum overlap position and the substantially aligned position that leave a plurality of short, laterally extending gaps free of lagging material isolated from each other between the attached strips.

5. The lagging system of claim 1 wherein the carrying members are backing plates having outboard portions that extend circumferentially beyond the edges of the lagging material for being welded to the pulley surface and having substantially the same predetermined configuration as the lagging material edges.

6. The lagging system of claim 5 wherein the effective width of the strips comprises a distance measured in the lateral direction between the backing plate outboard portions adjacent the leading and trailing edges, the distance being sized to be generally based on an even multiple of pi, and a predetermined whole number of the plurality of strips for fitting on a pulley surface having a diameter that is an even number.

7. The lagging system of claim 1 wherein the lagging strips each include a main elongate portion extending along the length of the strips and the predetermined configuration of the lagging material edges comprises a crenellated configuration so that the strips have a plurality of projecting portions of lagging material extending in the circumferential direction from the main elongate portion at spaced intervals along the length thereof and fitment spaces formed between the lagging material projecting portions into which the projecting portions of an adjacent one of the strips can be interfit.

8. The lagging system of claim 7 wherein the projecting portions of lagging material along the leading edge are longitudinally offset from the projecting portions of lagging material along the trailing edge.

9. The lagging system of claim 7 wherein the carrying members are backing plates including outboard portions that extend circumferentially beyond the edges of the lagging material for being welded to the pulley surface and having substantially the same crenellated configuration as the edges, and recesses in the outboard portions of the first and second lagging strips aligned with both the projecting portions and the fitment spaces so that the recesses along the leading or trailing edge of the strips are staggered circumferentially and with the first and second lagging strips attached to the pulley surface, the recesses from one of the first and second strips will be aligned with the facing recesses from the other of the first and second strips for forming an easily identifiable attachment slot therebetween.

10. The lagging system of claim 9 wherein the outboard portions include end sections at either end of respective ones of the recesses so that with the first and second strips in the maximum overlap position the facing end sections can be abutted against each other.

11. The lagging system of claim 1 wherein the leading and trailing edges of the lagging material have a generally crenellated configuration so that the strips include projecting portions with lagging material thereon to provide a checkerboard pattern of lagging material on the pulley surface.

12. The lagging system of claim 11 wherein the checkerboard pattern of lagging material on the pulley surface includes an optimized distribution of lagging material at predetermined levels of surface coverage on the pulley ranging from approximately sixty percent coverage with strips attached about the pulley surface each in the maximum overlap position to approximately forty percent coverage with strips attached about the pulley surface each in the substantially aligned position.

13. The lagging system of claim 1 wherein the predetermined configuration of the lagging material edges of the strips allows the strips to be attached with circumferential spacing between closest portions of facing edges kept below approximately 0.625 inch.

14. A pulley lagging system comprising:

a pulley rotatable about a pulley axis and having a drive surface for a conveyor belt extending in a circumferential direction thereabout and in a lateral direction across the pulley between ends thereof defining a lateral distance therebetween;

a plurality of elongate lagging members having a length and a width for being attached to the drive surface with the length of the lagging members extending in the lateral direction and the width of the lagging members extending in the circumferential direction;

lagging material of the elongate members including elongated leading and trailing edges thereof generally extending lengthwise along the members and having a predetermined configuration so that the elongated edges are in substantially non-coplanar relation with the pulley axis; and at least one short, laterally extending gap free of lagging material formed between facing leading and trailing edges of adjacent lagging members attached on the pulley surface and extending for a gap lateral distance less than the lateral distance between the ppully ends.

15. The pulley lagging system of claim 14 wherein the at least one gap comprises multiple short gaps free of lagging material separated from each other in the lateral direction.

16. The pulley lagging system of claim 14 wherein the predetermined configuration of the lagging material edges is one of a crenellated, oblique and stepped configuration.

17. The pulley lagging system of claim 14 wherein the predetermined configuration of the lagging material edges comprises a crenellated configuration so that the attached lagging members provide a checkerboard pattern of lagging material on the pulley with the at least one gap comprising multiple gaps free of lagging material that are isolated from one another.

18. The pulley lagging system of claim 14 wherein the adjacent lagging members include one lagging member having lagging material on both lateral sides of the gap.

19. The pulley lagging system of claim 18 wherein the predetermined configuration of the lagging material edges comprises a crenellated configuration.

20. The pulley lagging system of claim 14 wherein the adjacent lagging members include one lagging member having lagging material on one lateral side of the gap and another lagging member having lagging material on another lateral side of the gap.

21. The pulley lagging system of claim 20 wherein the predetermined configuration of the lagging material edges comprises one of a stepped and oblique configuration.

22. The pulley lagging system of claim 14 wherein the gap lateral distance is significantly less than the lateral distance between the pulley ends.

* * * * *

UNITED STATES PATENT AND TRADEMARK OFFICE
CERTIFICATE OF CORRECTION

PATENT NO. : 6,692,392 B2
DATED : February 17, 2004
INVENTOR(S) : Finnegan et al.

It is certified that error appears in the above-identified patent and that said Letters Patent is hereby corrected as shown below:

Title page,
Item [75], Inventors, delete "Naperville, IL", and add -- Wilmington, NC --.

Column 28,
Line 16, change "ppully", to -- pulley --.

Signed and Sealed this

First Day of June, 2004

JON W. DUDAS
*Acting Director of the United States Patent and Trademark Office*